(12) United States Patent
Shim et al.

(10) Patent No.: US 11,226,655 B2
(45) Date of Patent: Jan. 18, 2022

(54) ELECTRONIC APPARATUS FOR CONTROLLING SIZE OF DISPLAY, AND METHOD FOR CONTROLLING THE SAME

(71) Applicant: LG ELECTRONICS INC., Seoul (KR)

(72) Inventors: Hongjo Shim, Seoul (KR); Sunwon Yoo, Seoul (KR); Hyunhak Cho, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/917,743

(22) Filed: Jun. 30, 2020

(65) Prior Publication Data

US 2021/0278878 A1 Sep. 9, 2021

(30) Foreign Application Priority Data

Mar. 3, 2020 (KR) .............................. 2020/003018

(51) Int. Cl.
*G06F 1/16* (2006.01)

(52) U.S. Cl.
CPC .......... *G06F 1/1652* (2013.01); *G06F 1/1643* (2013.01)

(58) Field of Classification Search
CPC combination set(s) only.
See application file for complete search history.

(56) References Cited

U.S. PATENT DOCUMENTS

| 8,174,628 | B2 * | 5/2012 | Matsushita | .......... G09G 3/3406 |
| | | | | 348/836 |
| 9,152,180 | B2 * | 10/2015 | Kim | ...................... G06F 1/1652 |
| 9,230,468 | B2 * | 1/2016 | Kwack | .................. G06F 1/1652 |
| 9,424,790 | B2 * | 8/2016 | Cho | ...................... G06F 3/1438 |
| 10,203,863 | B2 * | 2/2019 | Kwon | .................. G06F 3/0412 |
| 10,963,016 | B1 * | 3/2021 | Oh | ........................ G06F 1/1626 |

(Continued)

FOREIGN PATENT DOCUMENTS

| JP | 2011-034087 | 2/2011 |
| KR | 20110048705 | 5/2011 |
| KR | 10-2019-0101184 | 8/2019 |

OTHER PUBLICATIONS

PCT International Application No. PCT/KR2020/003018, International Search Report dated Nov. 25, 2020, 4 pages.

(Continued)

*Primary Examiner* — Lisa Lea-Edmonds
(74) *Attorney, Agent, or Firm* — Lee, Hong, Degerman, Kang & Waimey PC

(57) ABSTRACT

Provided is an electronic apparatus including a flexible display comprising at least a portion disposed at a first surface, a body frame disposed at a second surface opposed to the first surface, a display frame moving to decrease a distance to a first region of the body frame in response to a reduction in size of the flexible display exposed on the first surface, a first sensor disposed at at least a portion of the first region of the body frame and configured to sense an approach of an object, and a controller configured to control the size of the flexible display exposed on the first surface based on measurement information of the first sensor. The first region includes a surface corresponding to a position of the display frame among at least one surface of the body frame.

20 Claims, 23 Drawing Sheets

(56) References Cited

U.S. PATENT DOCUMENTS

| | | | |
|---|---|---|---|
| 2013/0234951 A1* | 9/2013 | Kim | G06F 1/1652 |
| | | | 345/173 |
| 2014/0002430 A1 | 1/2014 | Kwack et al. | |
| 2014/0194165 A1 | 7/2014 | Hwang | |
| 2014/0313139 A1* | 10/2014 | Cho | G09G 5/10 |
| | | | 345/173 |
| 2015/0153777 A1 | 6/2015 | Liu et al. | |
| 2017/0318693 A1 | 11/2017 | Kim et al. | |
| 2018/0103132 A1* | 4/2018 | Prushinskiy | H04M 1/0268 |
| 2018/0364827 A1* | 12/2018 | Chung | H04M 1/0268 |
| 2019/0012008 A1* | 1/2019 | Yoon | H04M 1/725 |
| 2019/0146558 A1* | 5/2019 | Ohata | H04M 1/02 |
| | | | 361/679.21 |
| 2019/0261519 A1 | 8/2019 | Park et al. | |
| 2019/0320048 A1* | 10/2019 | Yang | H04M 1/0247 |
| 2019/0346954 A1* | 11/2019 | Jung | G06F 1/3209 |
| 2020/0050285 A1* | 2/2020 | Kwon | G09G 5/373 |
| 2020/0304613 A1* | 9/2020 | Cha | H04M 1/0237 |
| 2021/0157366 A1* | 5/2021 | Shim | G06F 3/0412 |
| 2021/0159585 A1* | 5/2021 | Choi | H01Q 1/243 |
| 2021/0166651 A1* | 6/2021 | Shim | G09G 5/003 |

OTHER PUBLICATIONS

European Patent Office Application Serial No. 20183200.3, Search Report dated Dec. 11, 2020, 14 pages.

\* cited by examiner

Moving direction of variable portion 2200  2220  2210

22b

2200

2201

ELECTRONIC APPARATUS FOR CONTROLLING SIZE OF DISPLAY, AND METHOD FOR CONTROLLING THE SAME

CROSS-REFERENCE TO RELATED APPLICATION

Pursuant to 35 U.S.C. § 119, this application claims the benefit of earlier filing date and right of priority to PCT International Application No. PCT/KR2020/003018 filed on Mar. 3, 2020, the contents of which are all hereby incorporated by reference herein in its entirety.

BACKGROUND

1. Field

The present disclosure relates to an electronic apparatus for controlling a size of a display based on sensing of an object with respect to the electronic apparatus, and a method for controlling the electronic apparatus. One particular embodiment relates to an electronic apparatus for controlling a size of a display in response to sensing of an object approaching at least a portion of the electronic apparatus, and a method for controlling the electronic apparatus.

2. Description of the Related Art

Advance of network technologies and expansion of infrastructure have enabled an electronic apparatus to perform a variety of professional tasks. Accordingly, there are increasing demands for an electronic apparatus including a display that displays content on a large screen.

However, since the size of the display with the large screen increases in proportion to the size of the screen, it is necessary to consider portability as well as the size of the display when it comes to the electronic apparatus of which portability is emphasized.

Accordingly, a display elastic enough to be foldable or wound may be applied to the electronic apparatus so that the size of the electronic apparatus can be changed only when necessary. For example, a partial region of a display may be wound on the rear or the inside of a mobile terminal and the size of the display to be exposed may be increased by unwinding or moving the wound part when necessary.

In such an electronic apparatus including a display capable of changing in size to be exposed, a region to be exposed may vary according to the size of the display. For example, when the display is extended from a first size to a second size, a portion hidden when the display is in the first size may be exposed when the display is in the second size. On the contrary, when the size of the display is reduced from the second size to the first size, the exposed portion may be hidden in the process of changing from the second size to the first size.

As such, when an object (for example, a users finger) is in contact with a portion to be exposed depending on a size of the display, a size change error of the display may occur or inconvenience in use may be caused. For example, in the case where a user's finger is located at a region exposed as the display increases in size, if the display decreases in size, the exposed region may become hidden according to the size reduction of the display. As a result, the user's finger may be caught in between a fixed part and a part that moves in response to the reduction in the size of the display. Accordingly, inconvenience in use of the electronic device may be caused when changing the size of the display.

SUMMARY

An aspect provides an electronic device and a method for controlling the same, the device which is capable of controlling a size of a display based on sensing of an object with respect to a region associated with a size change of the display so that the size change of the display can be performed based on a use state of the electronic apparatus.

Technical goals of the present disclosure are not limited as mentioned above and, although not mentioned, may include goals that can be clearly understood by those skilled in the art to which the present disclosure pertains, from the following description.

According to an aspect, there is provided an electronic apparatus including a flexible display comprising at least a portion disposed at a first surface, a body frame disposed at a second surface opposed to the first surface, a display frame moving to decrease a distance to a first region of the body frame in response to a reduction in size of the flexible display exposed on the first surface, a first sensor disposed at at least a portion of the first region of the body frame and configured to sense an approach of an object, and a controller configured to control a size of the flexible display exposed on the first surface based on measurement information of the first sensor. The size of the flexible display exposed on the first surface is changeable. The first region includes a surface corresponding to a position of the display frame among at least one surface of the body frame.

According to another aspect, there is provided a method for controlling an electronic apparatus comprising a flexible display. At least a portion of the flexible display is disposed at a first surface. The method includes identifying measurement information using a first sensor, and controlling a size of the flexible display exposed on the first surface of the electronic apparatus based on the measurement information of the first sensor. The first sensor may be disposed at at least a portion of a first region of a body frame located at a second surface opposed to the first surface of the electronic apparatus and configured to sense an approach of an object. The first region may include a surface corresponding to a position of the display frame in the body frame. The display frame may move to decrease a distance between the first area and the display frame in response to a reduction in the size of the flexible display exposed on the first surface.

According to yet another aspect, there is provided an electronic apparatus including a body frame, a display frame capable of slidably moving relative to the body frame in a first direction or a second direction opposite to the first direction, a flexible display comprising at least a portion disposed at the first surface of the body frame, a first sensor disposed at at least one region of a second surface opposed to the first surface of the body frame and configured to sense an approach of an object, and a controller configured to, based on measurement information sensed by the first sensor, control the size of the flexible display exposed on the first surface of the body frame. The flexible display exposed on the first surface changes in size as the body frame and the display frame slidably move relative to each other in the first direction or the second direction.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
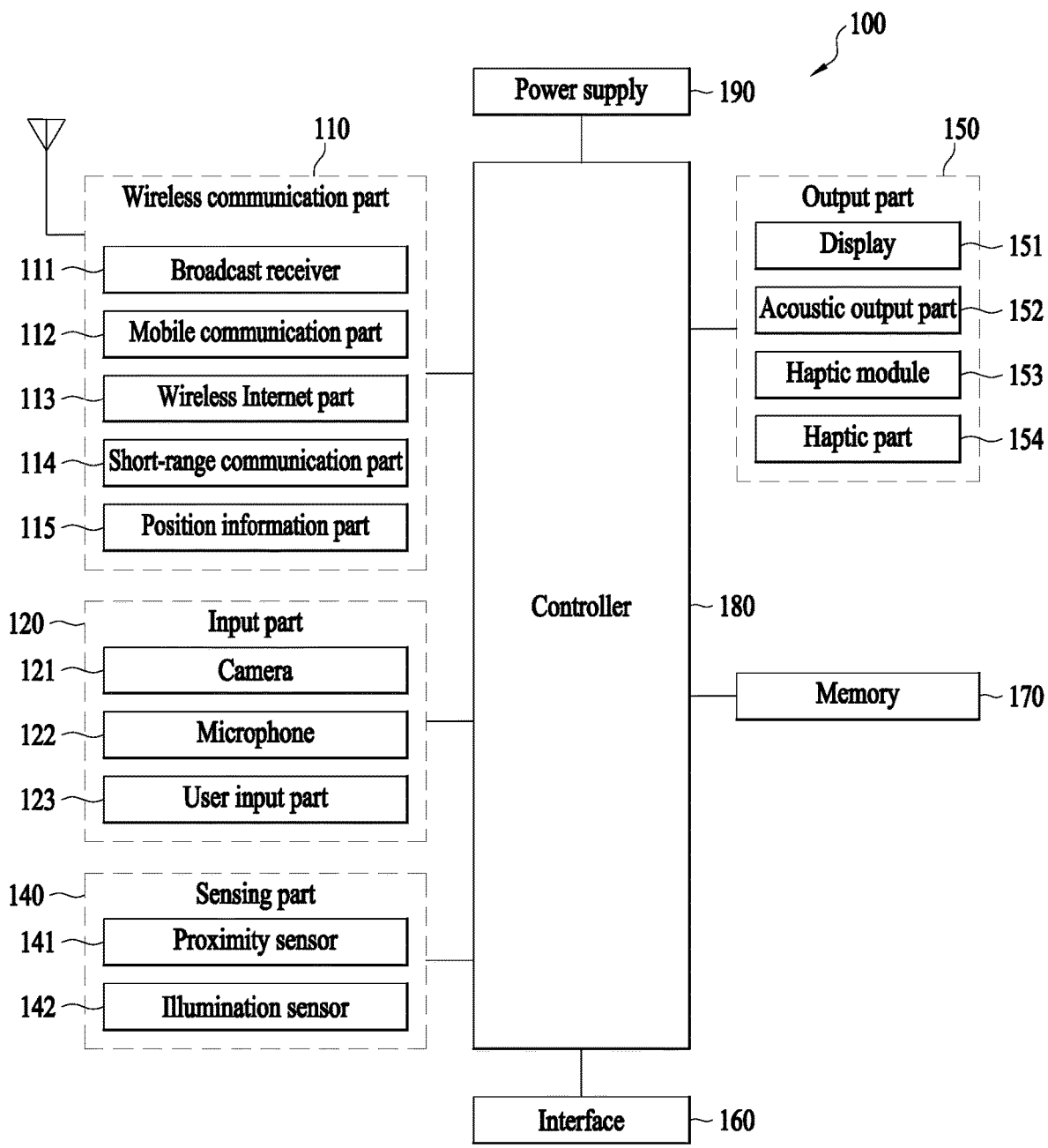
FIG. 1 is a block diagram illustrating an electronic device according to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure.

An electronic apparatus 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communication part 110 may include at least one module that enables wireless communication to be performed between the electronic apparatus 100 and a wireless communication system, between the electronic apparatus 100 and another electronic apparatus 100, or between the electronic apparatus 100 and an external server. The wireless communication part 110 may include one or more modules that connect the electronic apparatus 100 to one or more networks.

The wireless communication part 110 may include at least one of a broadcast receiver 111, a mobile communication part 112, a wireless Internet part 113, a short-range communication part 114, and a position information part 115.

Referring to the wireless communication part 110, the broadcast receiver 111 of the wireless communication part 110 may receive a broadcast signal and/or broadcast related information from an external broadcast management server through a broadcast channel. The broadcast channel may include a satellite channel and a terrestrial channel. Two or more broadcast receivers may be provided to the mobile terminal 100 for simultaneous broadcast reception or broadcast channel switching for at least two broadcast channels.

The mobile communication part 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal may include various types of data based on transmission and reception of a voice call signal, a video call signal, or a text/multimedia message.

The wireless Internet part 113 may refer to a module for wireless Internet access, and may be embedded or disposed external to the electronic apparatus 100. The wireless Internet part 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet part 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communication part 112.

The short-range communication part 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication part 114 may use wireless area networks to support wireless communication between the electronic apparatus 100 and a wireless communication system, wireless communication between the electronic apparatus 100 and another electronic apparatus 100, or wireless communication between the electronic apparatus 100 and a network in which another mobile terminal (100 or external server). The wireless range networks may be wireless personal area networks.

The position information part 115 may be a module that acquires a position (or current position) of a mobile terminal. A representative example of the position information part 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the position information part 115 may perform a certain function of other modules of the wireless communication part 110 to acquire data on the position of the mobile terminal, additionally or in substitution. The position information part 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The camera 121 may process an image frame such as a stationary image or a moving image acquired by an image sensor in a video call mode or a capturing mode. The processed image frame may be displayed on the display 151 or stored in the memory 170. For example, the electronic apparatus 100 may include a plurality of cameras 121. In this example, the cameras 121 may be arranged in a matrix structure. Through the cameras 121 arranged in the matrix structure, a plurality of pieces of image information having various angles and focal points may be input to the electronic apparatus 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the electronic apparatus 100. In the microphone 122, various noise removal algorithms may be implemented to remove noise generated in a process of receiving external acoustic signals.

The user input part 123 may be to receive information from a user. When the information is input through the user input part 123, the controller 180 may control an operation of the electronic apparatus 100 based on the input information. The user input part 123 may include a mechanical input means (or a mechanical key, for example, a button a dome switch, a jog wheel, and a jog switch on a front, rear, or side surface of the electronic apparatus 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic apparatus 100 and a user and simultaneously, provide an output interface between the electronic apparatus 100 and the user.

The acoustic output part 152 may output audio data stored in the memory 170 or received from the wireless communication part 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the electronic apparatus 100. For example, the acoustic output part 152 may include at least one of a receiver, a speaker, or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic apparatus 100. An event occurring in the electronic apparatus 100 may be, for example, message reception, a call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform an appropriate control associated with the connected external device.

The memory 170 may store data supporting various functions of the electronic apparatus 100. The memory 170 may store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program may be stored in the memory 170, installed in the electronic apparatus 100, and run by the controller 180 to perform an operation (or function) of the mobile terminal.

The controller 180 may generally control an overall operation of the electronic apparatus 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic apparatus 100.

The power supply 190 may supply power to each component included in the electronic apparatus 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

The electronic apparatus 100 may be in a bar shape but not limited thereto. The electronic apparatus 100 may have various shapes within the scope of not contradicting features of the present disclosure.

In the present disclosure, the electronic apparatus 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic apparatus 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic apparatus 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.)

Figure 2:
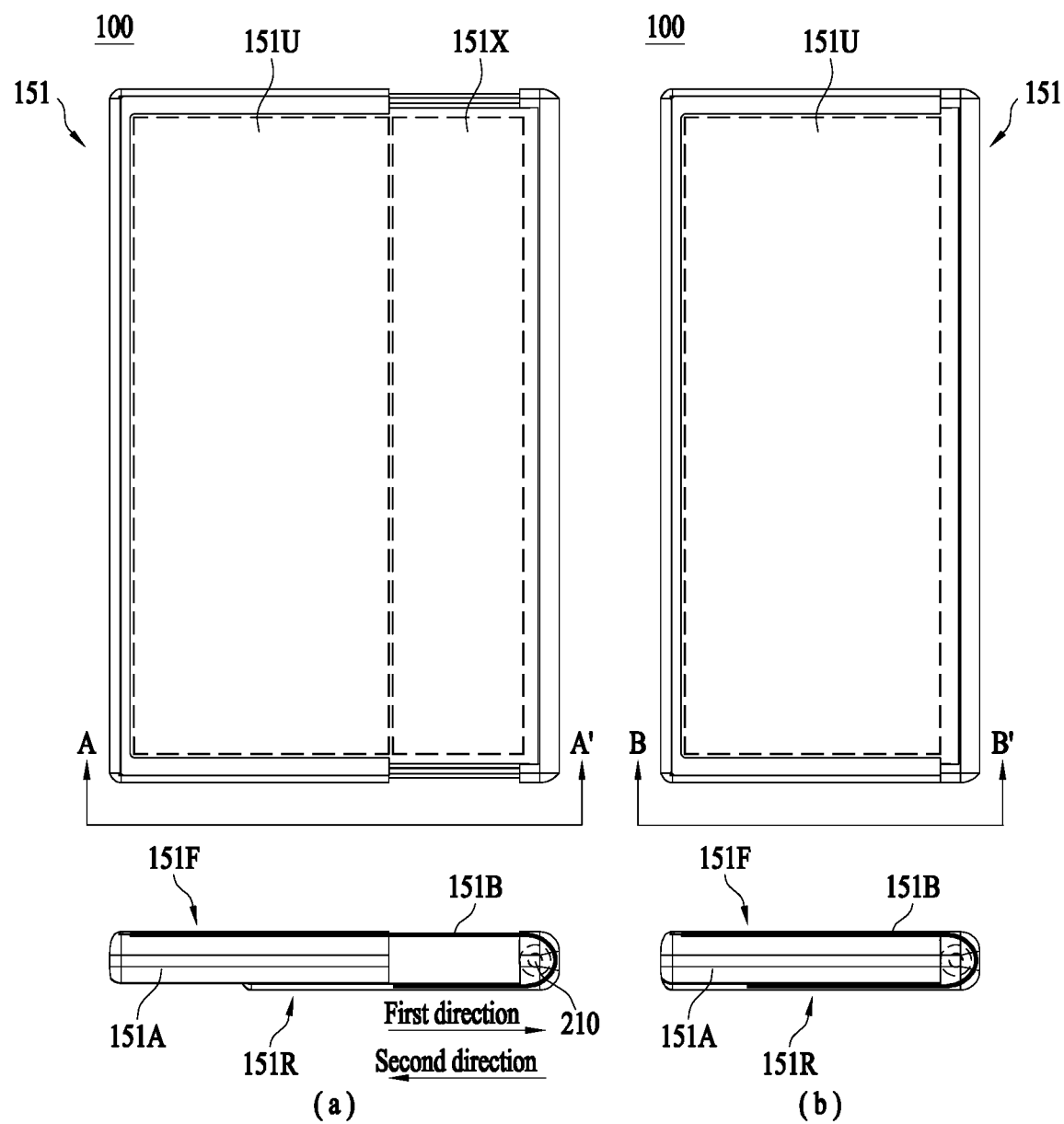
FIGS. 2 and 3 are conceptual views of an electronic apparatus related to the present disclosure before and after expansion of a display of the electronic apparatus.
Figure 3:
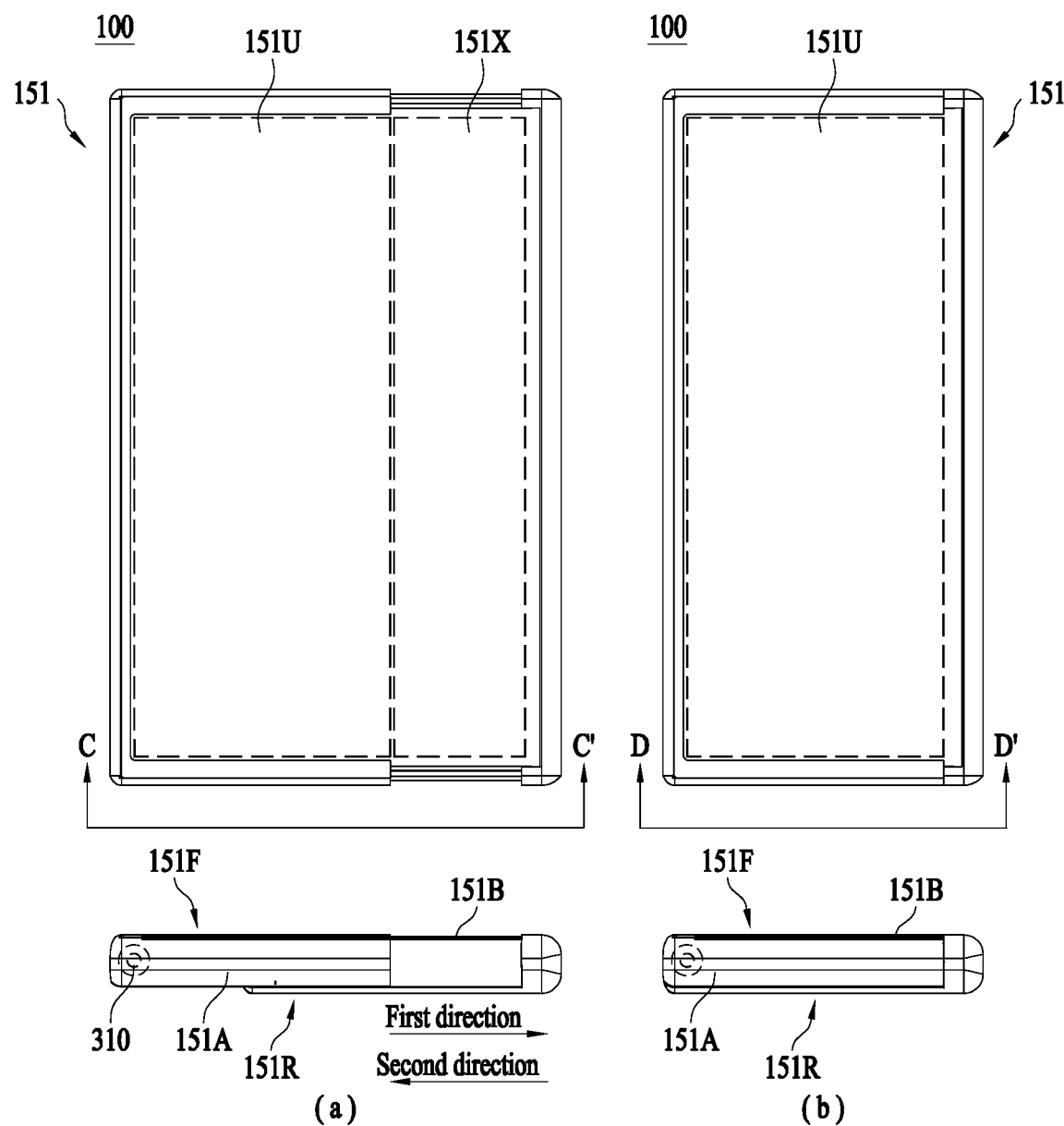

FIGS. 2 and 3 are conceptual diagrams illustrating the states before and after a display 151 of an electronic apparatus 100 related to an embodiment of the present disclosure is extended.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) in FIG. 2 illustrates an electronic apparatus 100 with the display 151 which is extended, and (b) in FIG. 2 illustrates the electronic apparatus 100 with the display 151 which is not extended.

Referring to FIG. 2, the display 151 may have one side fixed at a front surface with reference to the electronic apparatus 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state that the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed at the front surface. When the second frame 151B slidably moves in a direction opposite to the first direction to be retracted toward the first frame 151A, the front region 151F of the display 151 may be reduced as well, causing only the fixed part 151U to remain exposed at the front surface.

The rear region of the display 151 may be exposed at a rear surface of the second frame 151B. The rear region of the display 151 may be covered by a light-transmitting rear window and therefore visible from the outside.

Meanwhile, the front region 151F of the display 151 may be exposed at a front surface without an additional window. In some cases, however, a deco frame may cover a boundary region between the front region 151F and the first frame 151A, thereby preventing an external material and covering a bezel region of the electronic apparatus to help visibility of a screen for a user.

An electronic part may be formed in an inner surface formed by external structures such as the first frame 151A and the second frame 151B. An electronic component for driving the electronic apparatus 100, such as a battery 191, may be mounted at a main Printed Circuit Board (PCB) and thus provided in the electronic part. Alternatively, an electronic component such as an internal antenna module may be mounted directly at the electronic part rather than mounted at the main PCB.

In an embodiment, the electronic apparatus 100 may include a driving part for controlling a size of the display 151. The driving part may be implemented, for example, using a motor. The electronic apparatus 100 may control a size of the display 151 by controlling a moving direction of the first direction edge 210 of the display 151 using a motor.

Specifically, FIG. 3A illustrates an electronic apparatus 100 with a display 151 which is extended, and FIG. 3B illustrates the electronic apparatus 100 with the display 151 which is not extended.

Referring to FIG. 3, the display 151 may have one side fixed at a front region with reference to the electronic apparatus 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain at the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
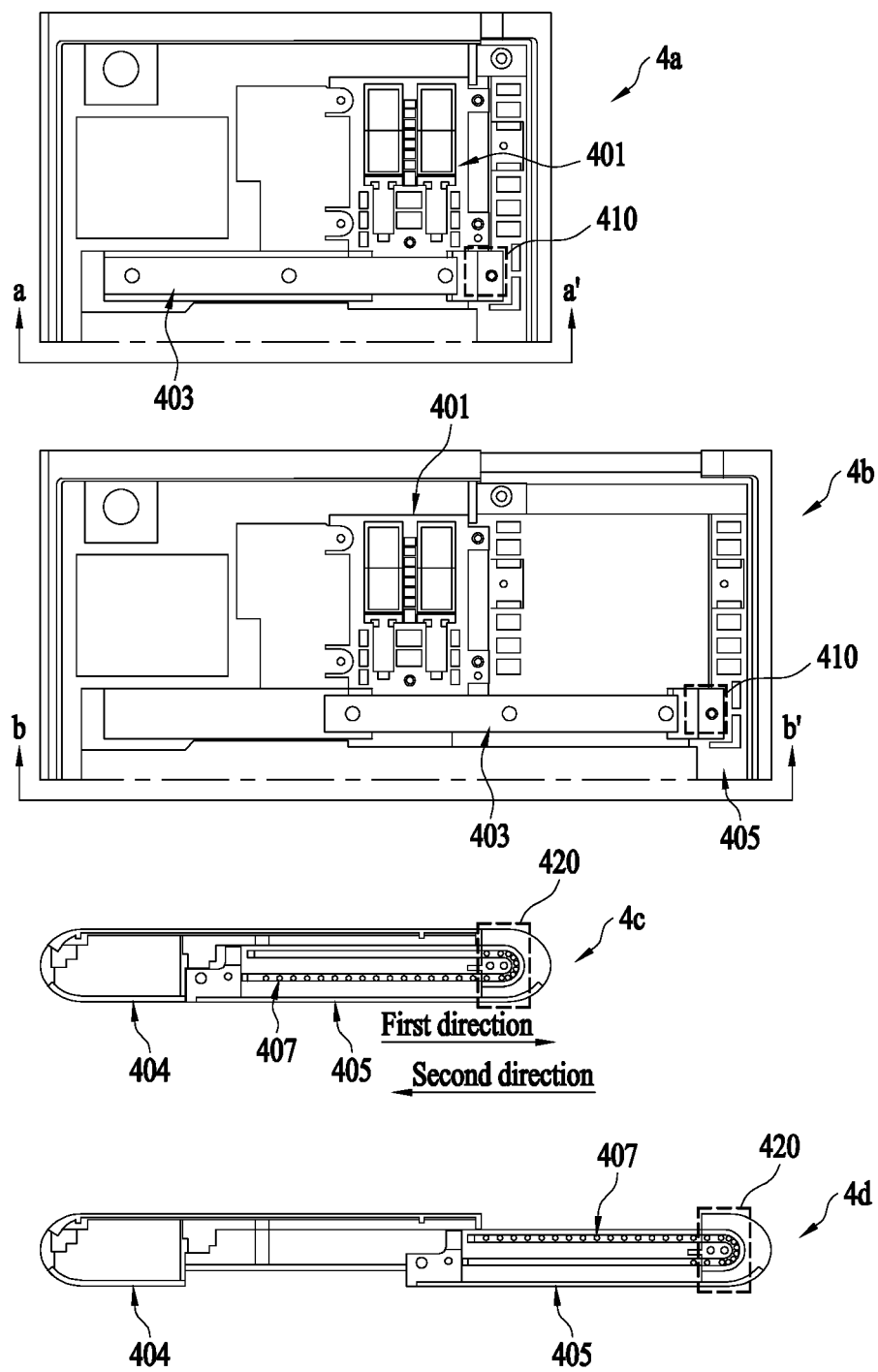
FIG. 4 is a diagram of an electronic apparatus related to the present disclosure before and after expansion of a display of the electronic apparatus.

FIG. 4 is a diagram of an electronic apparatus related to the present disclosure before and after expansion of a display of the electronic apparatus.

Reference numeral 4a of FIG. 4 shows a portion of the electronic apparatus before the display is expanded, and reference numeral 4b shows a portion of the electronic apparatus after the display is expanded. More specifically, reference numerals 4a and 4b conceptually illustrates a portion of the electronic apparatus to show an internal configuration of the electronic apparatus from a front surface of the electronic apparatus. In FIG. 4, some components of the electronic apparatus may be omitted for convenience of explanation.

According to reference numerals 4a and 4b, the electronic apparatus (e.g., the electronic apparatus 100 of FIG. 2) may include a motor 401 and a rack 403. The motor 401 and the rack 403 may be connected to each other. The rack 403 may move in response to a driving of the motor 401.

In some implementations, the motor 401 may include at least some passages to receive the rack 403, and the rack 403 may move through the passages of the motor 401 by a driving the motor 401. However, aspects of the present disclosure are not limited thereto, and connection between the motor 401 and the rack 403 may be implemented in various ways.

Although not illustrated, in some implementations, the motor 401 may include a pinion that engages the rack 403. For example, the pinion may include a toothed protrusion corresponding to the groove of the rack 403. As the protrusion of the pinion is inserted into the groove of the rack 403, the rack 403 and the pinion may engage each other. As the pinion is rotated based on the driving of the motor, the rack 403 and the pinion may engage each other. While the pinion is rotated, where the pinion and the rack 403 engage each other may be changed, and accordingly, the rack 403 may be moved.

Meanwhile, the combination of the rack 403 and the pinion may be referred to as a rack gear according to the embodiment, but embodiments of the present disclosure are not limited to the aforementioned term.

One end 410 of the rack 403 may be connected (or fastened) to a display or a configuration (e.g., an extension plate) that supports the display. In this case, the display or a display frame may be moved in response to the movement of the rack 403. For example, one end 410 of the rack 403 may be fixed and connected to a portion of a display frame 405. Accordingly, as the display frame 405 is moved in response to the movement of the rack 403, the size of the display may be controlled. Here, the display frame 405 may be a configuration to support the display and may be disposed to correspond to the display.

In some implementations, the rack 403 may have at least one groove. In this case, the movement of the rack 403 may be controlled based on a physical control associated with the groove. For a more detailed description, refer to FIG. 23.

Reference numeral 4c is a conceptual diagram of reference numeral 4a in the a-a' direction, and reference numeral 4d is a conceptual diagram showing reference numeral 4b in the b-b' direction.

According to reference numeral 4c, the electronic apparatus may include a rolling plate 407 disposed to correspond to the display. The rolling plate 407 may be a configuration supporting the display and having a structure in which a plurality of plates are connected to be curled or bent like a flexible display.

The display exposed on the first surface (e.g., the front surface) of the electronic device may be extended in the first direction and may be reduced in the second direction opposite to the first direction.

According to reference numerals 4c and 4d, the rolling plate 407 may be included (or disposed) in a region related to the display frame 405 (e.g., a space provided by the display frame 405), and the rolling plate 407 may be moved in response to the movement of the display frame 405. Specifically, in response to the display frame 405 moving based on the extension of the display, the rolling plate 407 may be moved to the front surface of the electronic apparatus with winding on one end 420 of the electronic apparatus.

Although not illustrated in detail, the display may be moved to the front surface of the electronic device in response to the movement of the rolling plate 406, and accordingly, the size of the display exposed on the first surface may increase.

In an embodiment, the other end of the display may include a guide rail that is formed to slidably move to correspond to a change in size of the display exposed on the first surface of the body frame 404 from a side surface of the display frame 405 perpendicular to the first direction.

As described above, the display frame 405 may be moved in response to a change in size of the display. In one embodiment, the display frame 405 may be in contact with at least a portion of the body frame 404 before the size of the display is expanded. In another embodiment, before the size of the display is expanded, the display frame 405 may be spaced apart from the body frame 404 at a predetermined interval. In this case, the spacing between the display frame 405 and the body frame 404 may increase to correspond to the expansion of the size of the display.

One end of the display may be disposed at the first surface of the body frame 404, and the other end of the display may be disposed at the rear surface of the display frame 405. In this case, the rear surface of the display frame may include a surface adjacent to the body frame and opposed to the front surface of the display frame. For example, the front surface of the display frame 405 may be a surface of the display frame 405 being adjacent to the body frame 404 and may include an upper surface of the display frame 405 in reference numeral 4c. The rear surface of the display frame 405 may be a surface opposed to the front surface of the display frame 405 and may include a lower surface of the display frame 405 in reference numeral 4c.

The rear surface of the display frame 405 may include a window (or a rear window). Specifically, a window may be disposed at the rear surface of the display frame 405, and the window may be formed of a material such as glass or plastic to cover the display. However, examples of the window are not limited thereto.

Meanwhile, arrangement of the motor 401 and the rack 403 in FIG. 4 and a connection type of configurations related thereto may vary according to an embodiment and is not limited to the example shown in FIG. 4.

In an embodiment, the display frame 405 may slidably move or relatively slidably move in a first direction or a second direction opposite to the first direction with respect to the body frame 404. As the body frame 404 and the display frame 405 slidably move or relatively slidably move in the first direction or the second direction, the display exposed on the first surface of the electronic apparatus (or the body frame 404) may change in size.

A relative sliding movement may include a movement of different elements sliding relative to each other. For example, a relative sliding movement may include a sliding movement of the display frame 405 relative to the body frame 404. However, this embodiment is not limited to these terms.

In an embodiment, one recessed region of the second surface of the body frame 404 may be exposed in response to a sliding movement of the display frame 405. One recessed region may be a region of the body frame 404 that is concavely recessed to facilitate coupling of the display frame 405, but is not limited thereto.

As will be described later, a sensor (or a first sensor) for sensing an approach of an object may be disposed perpendicularly to one recessed region of the second surface. In this case, the sensor may sense the approach of an object in one recessed region of the second surface.

Here, the body frame 404 may be a frame defining the shape of the electronic apparatus, the first surface of the body frame 404 may correspond to the front surface of the electronic apparatus, and the second surface of the body frame 404 may correspond to the second surface the electronic apparatus. For example, the front surface of the body frame 404 may correspond to the front surface of the electronic apparatus, and the rear side of the body frame 404 may correspond to the rear surface of the electronic apparatus.

Figure 5:
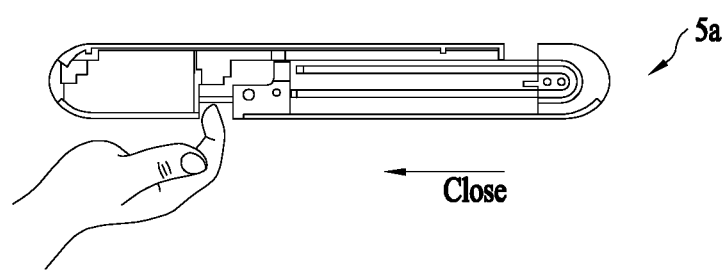
FIG. 5 is a diagram illustrating an operation of an electronic device according to an embodiment of the present disclosure.
Figure 5:
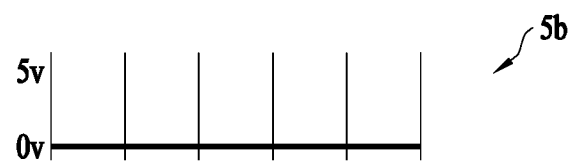
Figure 5:
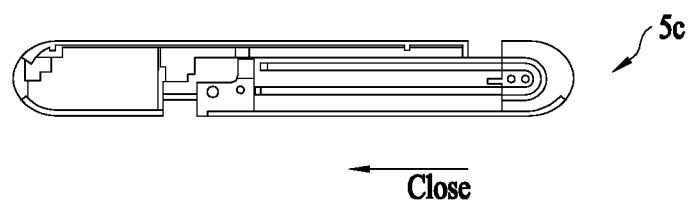
Figure 5:

FIG. 5 is a diagram illustrating an operation of an electronic device according to an embodiment of the present disclosure.

Reference numeral 5a shows the case where an object's approach to the electronic apparatus is sensed, and reference numeral 5b shows a duty cycle of the motor when the object's approach is sensed. Reference numeral 5c shows the case where an object's approach to the electronic apparatus is not sensed, and reference numeral 5d shows a duty cycle of the motor when the object's approach is not sensed.

According to reference numeral 5a, the approach of an object may be sensed while the size of the display exposed on the first surface of the electronic apparatus is reduced. According to an embodiment, as the size of the display exposed on the first surface is reduced, the display at the first surface may be moved to the second surface. However, in some cases, in response to the reduction in the size of the display exposed on the first surface, an object (for example, a user's finger) may be placed at a position at which the display at the second surface is supposed to be placed.

In this case, the electronic apparatus may control a motor that controls movement of the display. For example, the electronic apparatus may control the duty cycle of the motor to become 0 (or 0%), as shown in reference numeral 5b, so as to stop reducing the size of the display. Meanwhile, the duty cycle may represent the ratio of a total duration of pulse to a total time within a specific time period during which a continuous operation of the motor is made. Since the duty cycle is obvious to those skilled in the art, a detailed description thereof will be omitted.

According to reference numeral 5c, the object may not approach while the size of the display exposed on the first surface of the electronic apparatus is reduced. In this case, the approach of the object may not be sensed, and the electronic apparatus may control the motor to have a general duty cycle in response to the reduction in the size of the display, as shown in reference numeral 5d. Here, the duty cycle in response to the reduction in the size of the display may be predetermined and the duty cycle is not limited to the example as shown in reference numeral 5d.

Figure 6:
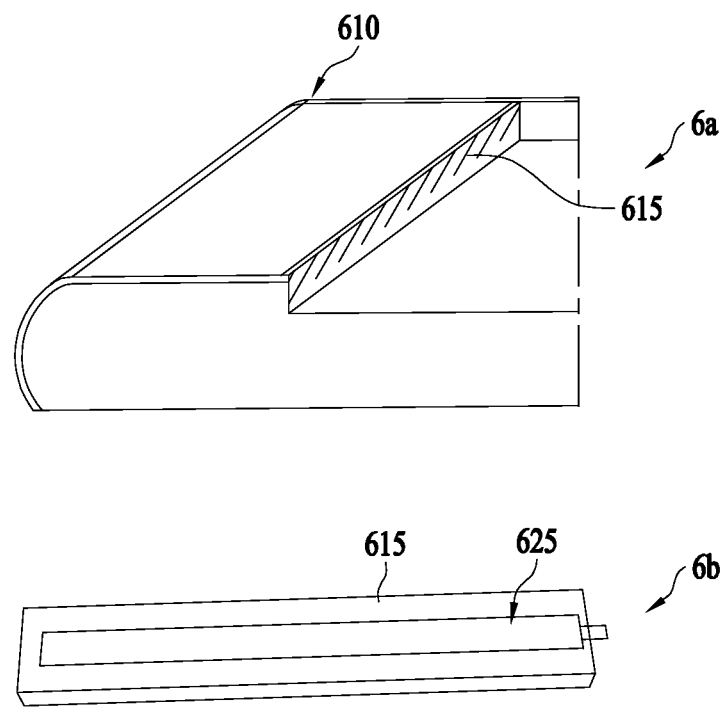
FIGS. 6 and 7 are diagrams illustrating a sensor disposed in an electronic device according to an embodiment of the present disclosure.
Figure 7:
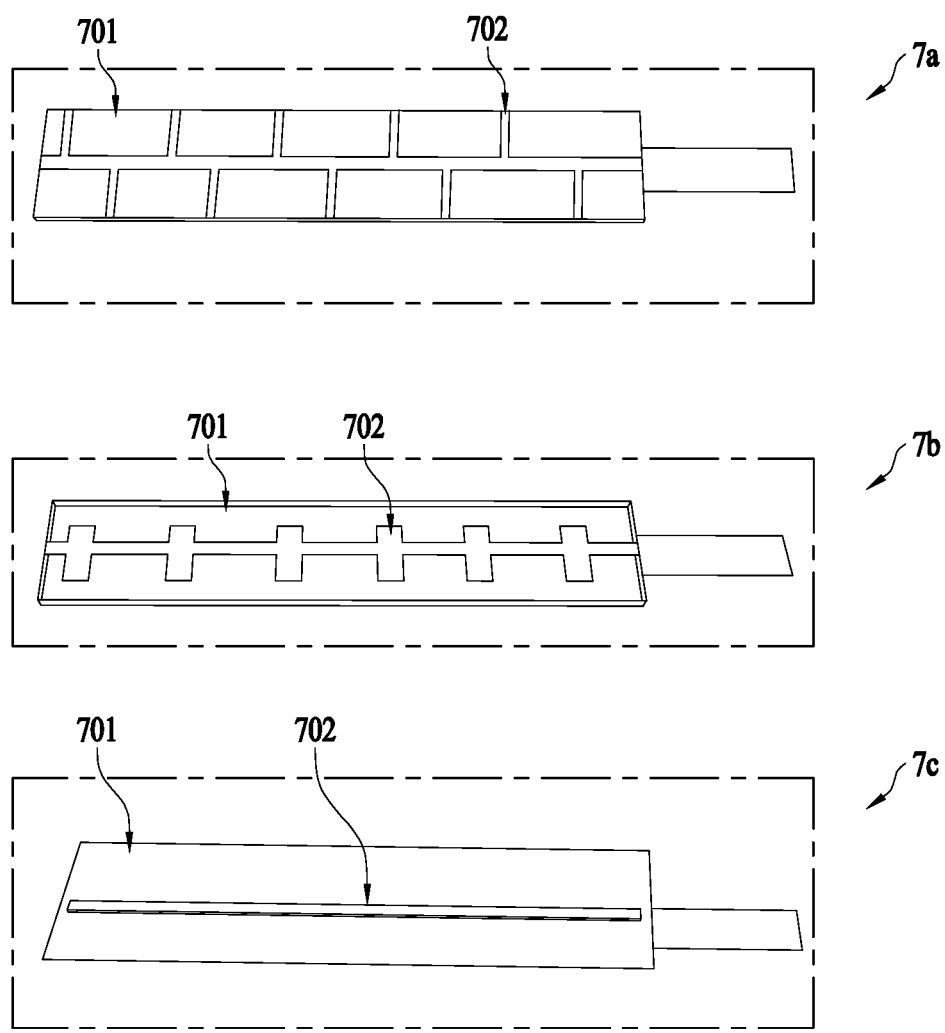

FIGS. 6 and 7 are diagrams illustrating a sensor disposed in an electronic device according to an embodiment of the present disclosure; Specifically, FIG. 6 is a diagram illustrating a configuration of an electronic apparatus in which a sensor is disposed, and FIG. 7 is a diagram illustrating an example of the sensor.

Reference numeral 6a in FIG. 6 shows a portion of the second surface (e.g., the rear surface) of the electronic apparatus. More specifically, the second surface of the electronic apparatus may include a fixed part and a variable part. A camera may be disposed at the fixed part, and the fixed part may include a portion of the electronic apparatus which is fixed at a predetermined position regardless of a change in size of the display. The variable part may include another portion of the electronic apparatus which changes in position to correspond to a change in size of the display.

Reference numeral 6a may show the fixed part of the electronic apparatus. According to reference numeral 6a, the fixed part may include a body frame 610.

In an embodiment, the body frame 610 may be a set of metal frames having different shapes. For example, the body frame 610 may be at least one frame defining a body shape of the electronic apparatus and may include a fixed part disposed at the second surface of the electronic apparatus, that is, a configuration fixed at a predetermined position regardless of a change in size of the display.

Although not illustrated, the electronic apparatus may further include a display frame that reduces in distance to (or comes into contact with) the body frame 610 as the size of the display exposed on the first surface is reduced. The display frame may be is a physical configuration supporting the display and may be moved in response to a change in size of the display. For example, the display frame may be is a portion at which the rolling plate 407 shown in FIG. 4 is disposed, and the display frame may be included in the variable part of the electronic apparatus which is moved in response to a change in size of the display.

A sensor for sensing an approach of an object may be disposed at the body frame 610. For example, the sensor may be disposed at at least a portion of one surface (or a first region) 615 corresponding to the variable part in the body frame 610. In another example, the sensor may be positioned in one region of the second surface of the body frame 610, the one region which corresponds to a direction in which the display frame slidably moves. In this case, the sliding movement may be made in the first direction or the second direction.

In an embodiment, one surface 615 may be a surface corresponding to the position of the display frame or a surface facing the display frame. As the sensor is disposed at the surface of the body frame 610 in contact with the display frame, it is easy to identify the presence of any object between the two frames (the body frame 610 and the display frame) when the display frame approaches the body frame 610. According to a result of the identification, it is possible to control the size of the display.

As an example, when a finger detectable by the sensor is positioned between the two frames (the body frame 610 and the display frame), it is possible to stop reducing the size of the display, thereby preventing the finger from being caught between the two frames.

According to reference numeral 6b, one surface 615 may include a printed circuit board (PCB) (or a flexible PCB (FPCB)), and an electrode 625 of the sensor may be disposed at at least a portion of the PCB. The electrode (or an electrode part) 625 may be disposed in a long and thin shape on one surface, as shown in FIG. 6. However, the electrode 625 is not limited thereto, and various examples of the electrode 625 will be described later with reference to FIG. 7.

In an embodiment, the sensor may include a sensor that detects an approach of an object based on a degree of change in capacitance caused by the approach of the object to the electrode. For example, the sensor may include a CAP sensor (or an SAR sensor). A sensitivity of the sensor may be determined according to the size of the electrode. Accordingly, the size of the electrode of the electronic apparatus according to the embodiment of the present disclosure may be predetermined. Meanwhile, since the operating principle of the CAP sensor is obvious to those skilled in the art, a detailed description thereof will be omitted.

In an embodiment, a portion at which the sensor (or the electrode of the sensor) is disposed may be a portion in the inside of the body frame, that is, a portion not exposed to the outside. Accordingly, only the body frame may be exposed to the outside.

FIG. 7 shows various examples in which an electrode 702 of the sensor in FIG. 6 is implemented to have a specific pattern. Specifically, as shown in reference numerals 7a and 7b, the electrode 702 may be disposed in a shape in which the electrode 702 is divided into several branches on the PCB 701. Such an electrode 702 may be generated by removing (or etching) at least a portion of the electrode 702 having a size corresponding to that of the PCB 701.

In some cases, as shown in reference numeral 7c, the electrode 702 may be disposed in the shape of one long line on the PCB 701. Like the electrodes 702 shown in reference numerals 7a and 7b, the electrode 702 shown in reference numeral 7c may also be generated by removing at least a portion of the electrode having a size corresponding to that of the PCB 701.

In an embodiment, the electrodes 702 shown in FIG. 7 may have different shapes but have the same size or width. That is, the electrode 702 included in the sensor of the electronic apparatus may be implemented in various shapes (patterns) of a predetermined size.

Although not illustrated, the sensor may include a detecting part that detects a change in capacitance, and one end of the electrode 702 shown in FIG. 7 may be connected to the detecting part of the sensor. Accordingly, the electronic apparatus may use the sensor to detect an approach of an object to the surroundings (or within a predetermined distance range) of the sensor.

Hereinafter, the sensor may be referred to as a first sensor, but this embodiment is not limited thereto.

Figure 8:
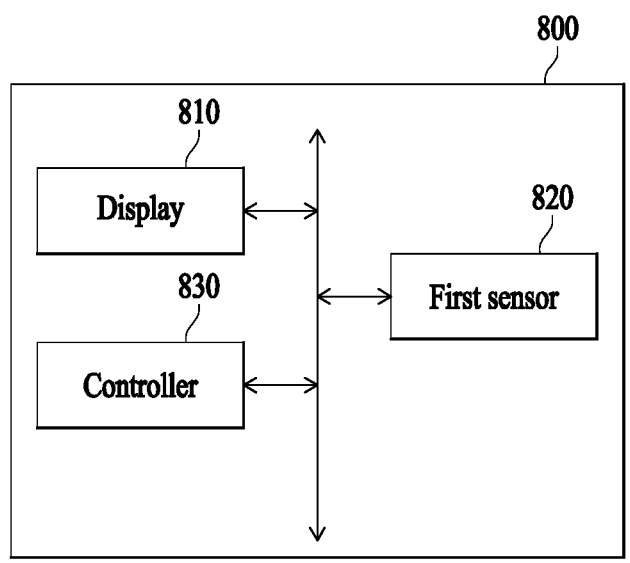
FIG. 8 is a functional block diagram of an electronic device according to an embodiment of the present disclosure.

FIG. 8 is a functional block diagram of an electronic device according to an embodiment of the present disclosure. Any element of the electronic apparatus 800 described later refers to a unit for processing at least one function or operation, and such an element may be implemented in hardware, software, or a combination of hardware and software.

The electronic apparatus 800 may include a display 810, a first sensor 820, and a controller 830.

The display 810 may be disposed such that the size of the display 810 exposed on a first surface of the electronic apparatus 800 (for example, a front surface of the electronic apparatus 800) can be changed. The display 810 may be implemented to be flexible.

The display 810 may display various types of information associated with the operation of the electronic apparatus 800. For example, the display 810 may display a content associated with an application or a content indicative of the application based on an execution of the application.

In an embodiment, a portion of the display 810 may be disposed at the first surface, and another portion of the display 810 may be wound on one surface of the electronic apparatus 800 and disposed at the second surface of the electronic apparatus 800. In this case, the first surface may include a front surface of the electronic apparatus 800, and the second surface may include a rear surface of the electronic apparatus 800 opposed to the first surface.

Specifically, the display 810 may be bent at one end in contact with the first surface, at least a portion of the display 810 may be disposed at the first surface, and at least another portion of the display 810 may be disposed at the second surface in contact with the one end. Since the related description has been made with reference to FIG. 2 or 3, a repeated description will be omitted.

The first sensor 820 may include a sensor for detecting an approach of an object. The first sensor 820 may be disposed at at least a portion of the electronic apparatus 600, for example, a body frame. More specifically, for example, the first sensor 820 may be located at a surface of the body frame, the surface which corresponds to the position of the display frame. Since the related description has been made with reference to FIG. 6, a repeated description will be omitted.

In an embodiment, the first sensor 820 may include a metallic electrode part and a detecting part configured to detect a change in capacitance of the electrode part. The electrode part and the detecting part may be connected. In addition, the electrode part may have a size that is predetermined based on a degree of change in capacitance caused by the approach of an object.

In an embodiment, the electrode part of the first sensor 820 may be implemented in various patterns. For example, the electrode part may be implemented in the shape of a long and thin line. In another example, the electrode part may be implemented in a pattern in which a plurality of lines extends from the center line. In yet another example, the electrode part may be implemented in the shape of a zig-zag line.

In an embodiment, the electronic apparatus 800 may include a fixed part and a variable part that moves in response to a change in size of the display 810 exposed on the first surface. The first sensor 820 may be located at the fixed part of the electronic apparatus 800. In this case, the display 810 may be located at the variable part of the electronic apparatus 800. For the fixed part and the variable part, refer to FIGS. 2 and 3.

When the display 810 extends in a first direction, the first sensor 820 may be located adjacent to one side surface of the electronic apparatus 800 in a direction opposite to the first direction. That is, the first sensor 820 may be located in the opposite of the first direction.

In an embodiment, the first sensor 820 may include at least one of a pressure sensor, a touch sensor, and an optical sensor. Specifically, the first sensor 820 may be at least one of the pressure sensor, the touch sensor, and the optical sensor instead of the aforementioned CAP sensor, or the first sensor 820 may further include at least one of the pressure sensor, the touch sensor, and the optical sensor in addition to the CAP sensor.

The pressure sensor may be a sensor for sensing a pressure and may include, for example, at least one of a strain gauge pressure sensor, an inductive pressure sensor, a micro electro mechanical systems (MEMS) ultrasonic pressure sensor, and a piezo ultrasonic pressure sensor. For a specific example, refer to FIG. 11.

The touch sensor may be a sensor for sensing a user's touch, and various touch sensors may be used. For a specific example, refer to FIG. 12.

The optical sensor may include at least one light emitting diode (LED) and at least one photodiode (PD). The at least one LED and the at least one PD may be arranged alternately, and accordingly, a receiver and an emitter of the optical sensor may also be arranged alternately. For a specific example, refer to FIGS. 13 and 14.

The controller 830 may control the size of the display exposed on the first surface based on measurement information of the first sensor 820.

In an embodiment, the controller 830 may reduce the size of the display 810 exposed on the first surface in response to a first input instructing a reduction in the size of the display 810 exposed on the first surface. For example, the controller 830 may reduce the size of the display 810 when the first input instructing a reduction in the size of the display 810 is acquired.

In an embodiment, the controller 830 may identify measurement information of the first sensor 820 and control an operation of reducing the size of the display 810 based on the identified measurement information. For example, when the measurement information of the first sensor 820 satisfies a specific condition, the controller 830 may stop reducing the size of the display 810 or continue to reduce the size of the display 810. In another example, when the measurement information of the first sensor 820 satisfies a specific condition, the controller 830 may stop reducing the size of the display 810 and increase the size of the display 810.

A specific condition may include a condition predetermined in association with the approach of an object. For example, the specific condition may include a condition in which a sensing value indicated by measurement information is equal to or greater than a predetermined value. In another example, the specific condition may include a condition in which a result indicated by measurement information corresponds to a result of detection of the object.

When measurement information of the first sensor 820 satisfies a specific condition, the controller 830 may display a user interface (UI) indicating the approach of an object (or a user's finger) on the display 810. For a specific example thereof, refer to FIG. 21.

The controller 830 may identify measurement information of the first sensor 820 in response to a reduction in the size of the display 810 or irrespective of a reduction in the size of the display 810.

In an embodiment, the controller 830 may change the size of the display 810 exposed on the first surface according to an instruction regarding a reduction in the size of the display 810 exposed on the first surface. For example, the controller 830 may reduce the size of the display 810 exposed on the first surface based on an instruction for reducing the size of the display 810.

When any object adjacent to a space defined as the display 810 disposed at the second surface moves to the first surface is sensed based on the measurement information of the first sensor 820, the controller 830 may stop changing the size of the display 810 exposed on the first surface. The space may include a space where the display 810 is previously located before the display 810 disposed at the second surface moves to the first surface.

When any object adjacent to the space is not sensed based on the measurement information of the first sensor 820, the controller 830 may continue to reduce the size of the display 810 exposed on the first surface according to an instruction. The instruction may include, for example, a command. When any object adjacent to the space is sensed, the controller 830 may control the display 810 based on an instruction for continuing to reduce the size of the display 810. The instruction may be stored in advance in a memory of the electronic apparatus 800. Since the instruction is obvious to those skilled in the art, a detailed description thereof will be omitted.

In this case, the space defined as the display 810 disposed at the second surface moves to the first surface may include a space adjacent to the second surface and formed as a result of the movement of the display 810. If the display 810 returns back to the second surface, the space may be closed.

In an embodiment, the controller 830 may reduce the size of the display 810 exposed on the first surface in response to a first input instructing a reduction in the size of the display 810 exposed on the first surface. When the size of the display 810 exposed on the first surface is less than a first size, the controller 830 may, based on measurement information of the first sensor 820, stop reducing the size of the display 810 exposed on the first surface corresponding to the first input.

Specifically, when the size of the display 810 exposed on the first surface is reduced to be less than the first size based on a size reduction of the display 810 exposed on the first surface, the controller 830 may identify measurement information of the first sensor 820. When the identified measurement information satisfies a specific condition, the controller 830 may stop reducing the size of the display 810 exposed on the first surface. For example, when a sensing value indicated by the identified measurement information is equal to or greater than a predetermined value, the controller 830 may stop reducing the size of the display 810 exposed on the first surface.

In some cases, the controller 830 may stop reducing the size of the display 810 and increase the size of the display 810 again.

In an embodiment, the size of the display 810 in association with identifying of the measurement information, that is, the first size, may be predetermined. For example, the first size may be predetermined based on a user input. In this case, the controller 830 may provide a UI for designating the first size. For a more specific example of the UI regarding the designation of the first size, refer to FIG. 19.

In an embodiment, the electronic apparatus 800 may include an extension plate which is positioned adjacent to an inner side of the display 810 exposed on the first surface, and which is capable of moving in response to a change in the size of the display 810 exposed on the first surface. A marker may be provided at a predetermined point of the extension plate to indicate a position, and the electronic apparatus 800 may further include a second sensor for sensing the marker.

In this case, the marker may be located on an extension plate facing the second surface of the electronic apparatus 800 and may be a configuration separate from the extension plate. The second sensor may be located on a board (e.g., a PCB) that is fixed irrespective of a change in the size of the display exposed on the first surface of the electronic apparatus 800. The second sensor may be a sensor for sensing a degree of change based on recognition of a surface of a target object, and may include, for example, an optical track sensor (OTP).

In an embodiment, when the marker of the extension plate is sensed using the second sensor, the controller 830 may identify measurement information of the first sensor 820. The controller 830 may control the size of the display 810 based on the identified measurement information.

For example, when the marker of the extension plate is sensed using the second sensor and an object adjacent to the first sensor 820 is sensed, the controller 830 may stop reducing the size of the display 810 exposed on the first surface or may increase the size of the display 810 exposed on the first surface. If the marker is sensed using the second sensor but the object is not sensed using the first sensor 820, the controller 830 may continue to reduce the size of the display 810 exposed on the first surface. For a specific example of the second sensor, refer to FIG. 18.

In an embodiment, the electronic apparatus 800 may include a motor and a rack that moves in response to a driving of the motor. The rack may be in the shape of a bar having at least one groove. The rack may move in response to the driving of the motor. Based on the movement of the rack, the size of the display 810 exposed on the first surface may be changed. The controller 830 may control the size of the display 810 by driving the motor to move the rack.

For example, the controller 830 may control the duty cycle of the motor to a first value (e.g., 0%) to thereby stop the rack from moving, stopping changing the size of the display 810. In another example, the controller 830 may control the duty cycle of the motor to a second value (e.g., 75%) to thereby move the rack, continuing to change the size of the display 810.

In an embodiment, the electronic apparatus 800 may include a stopper that limits movement of the rack. The stopper may be positioned adjacent to at least a portion of the rack. The stopper may include a head corresponding to a size of the groove of the rack. When the head of the stopper is inserted into the groove of the rack, the movement of the rack may be limited. Based on measurement information of the first sensor 820, the controller 830 may allow at least a portion of the head of the stopper to be inserted into the groove so that a size change of the display 810 can be limited. For a more specific example of the stopper, refer to FIGS. 22 and 23.

In an embodiment, when it comes to changing the size of the display 810 based on measurement information of the first sensor 820, whether to stop reducing the size of the display 810 or increase the size of the display 810 again may be predetermined. For example, whether to stop reducing the size of the display 810 or increase the size of the display 810 again may be predetermined based on a user input. In this case, the controller 830 may provide a UI for selecting a method for controlling a size change. For a more specific example, refer to FIG. 20.

In addition, in some cases, when the size of the display 810 is to be increased in a predetermined condition, a degree of the increase in the size of the display 810 may be predetermined. For example, the degree of the increase in the size of the display 810 may correspond to a predetermined size. That is, the size of the display 810 may be increased so that the size of the display 810 exposed on the first surface can be the first size. In another example, the degree of the change in the size of the display 810 may correspond to a size that the display 810 has at a point in time when the size of the display 810 is reduced. That is, the size of the display 810 may be increased to a size that the display 810 has at a point in time when an input instructing a reduction in the size of the display 810 is received.

In an embodiment, the electronic apparatus 800 may include a fixed part, a variable part moving in response to a change in the size of the display 810, and a buffering part connected to the fixed part and having at least a portion to be overlapped with the variable part in response to a reduction in the size of the display 810 exposed on the first surface.

In an embodiment, the buffering part may be disposed at one surface of the fixed part. The buffering part may include a spring disposed in a direction corresponding to a moving direction of the variable part, and a third sensor connected to the spring to sense pressure against the spring.

In this case, the controller 830 may stop changing the size of the display 810 or increase the size of the display 810 exposed on the first surface based on the pressure sensed by the third sensor. For example, the controller 830 may stop changing the size of the display 810 or increase the size of the display 810 exposed on the first surface when the pressure sensed by the third sensor exceeds a first value. For a more specific example, refer to FIGS. 15 and 16.

In some cases, the third sensor may replace the first sensor 820, but aspects of the present disclosure are not limited thereto. The first sensor 820 and the third sensor may be disposed together.

In another embodiment, the buffering part may include a guide bar, at least one first spring, a protrusion, and a second spring. The guide bar may be configured in the shape of a bar having at least a portion in contact with the variable part. The at least one first spring may be in contact with the fixed part and the guide part, and may be provided as springs disposed at predetermined intervals to provide an elastic force according to movement of the guide bar. More specifically, one end of the at least one first spring may be in contact with the fixed part and the other end thereof may be in contact with the guide bar. Accordingly, an elastic force may be provided when a pressure is applied to the guide bar.

The protrusion may be disposed at one surface of the fixed part in a direction corresponding to a moving direction of the variable part. In some implementations, the protrusion may be implemented as a cylindrical bar, but not limited thereto. The second spring may include a spring that surrounds the protrusion.

In some cases, the guide bar may have a through hole through which the protrusion passes when the first spring is compressed. In this case, the buffering part may further include a support that contacts the second spring, contacts the inner surface of the guide bar, and moves to the size of the fixed part when the second spring is compressed. For a more specific example, refer to FIG. 17.

Figure 9:
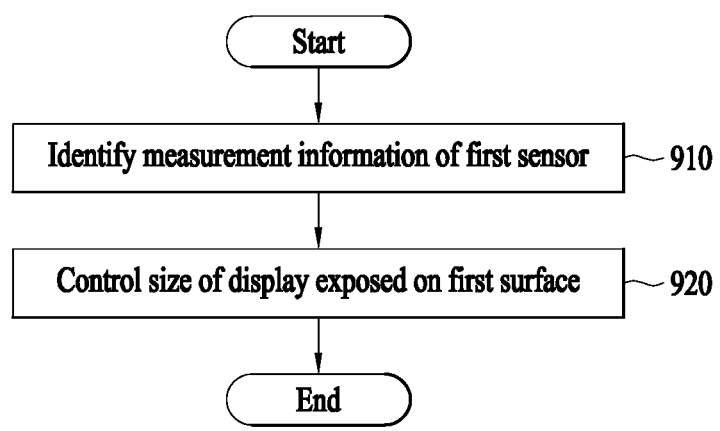
FIG. 9 is a flowchart of a method for controlling an electronic device according to an embodiment of the present disclosure.

FIG. 9 is a flowchart of a method for controlling an electronic device according to an embodiment of the present disclosure. Operations of the method shown in FIG. 9 may be performed in an order different from that shown in FIG. 9 or irrespective of the order. Hereinafter, a repeated description may be omitted.

Referring to FIG. 9, the electronic apparatus may identify measurement information of the first sensor in operation 910. The first sensor may be a sensor for sensing the approach of an object and may include, for example, a CAP sensor. The first sensor may be disposed at the body frame of the electronic apparatus. The body frame may be a frame located at the second surface (e.g., the rear surface) opposed to the first surface (e.g., the front surface) of the electronic apparatus, the frame which defines the shape of the electronic apparatus.

In an embodiment, the electronic apparatus may identify measurement information of the first sensor in response to a reduction of the size of the display exposed on the first surface. For example, when the electronic apparatus receives a first input instructing a size reduction of the display exposed on the first surface, the electronic apparatus may identify measurement information through the first sensor. The measurement information may be information indicating whether an object is approaching and may include, for example, a sensing value equal to or greater than a predetermined value.

In an embodiment, the electronic apparatus may identify a change in the size of the display exposed on the first surface in response to an input instructing a reduction in the size of the display. When the size of the display exposed on the first surface is less than a first size, the electronic apparatus may identify the measurement information of the first sensor.

The electronic apparatus may control the size of the display exposed on the first surface based on the identified measurement information in operation 920. For example, when the measurement information satisfies a specific condition, the electronic apparatus may stop reducing the size of the display exposed on the first surface.

In another example, when the measurement information satisfies a specific condition, the electronic apparatus may stop reducing the size of the display exposed on the first surface and control the size of the display to a first size. In this case, the first size may correspond to a size greater than the size that the display has when the measurement information is identified.

In an embodiment, the electronic apparatus may identify whether any object adjacent to a space defined as the display disposed at the second surface moves to the first surface is sensed based on the measurement information. When any object adjacent to the space defined as the display moves to the first surface is sensed, the electronic apparatus may control the size of the display exposed on the first surface.

Figure 10:
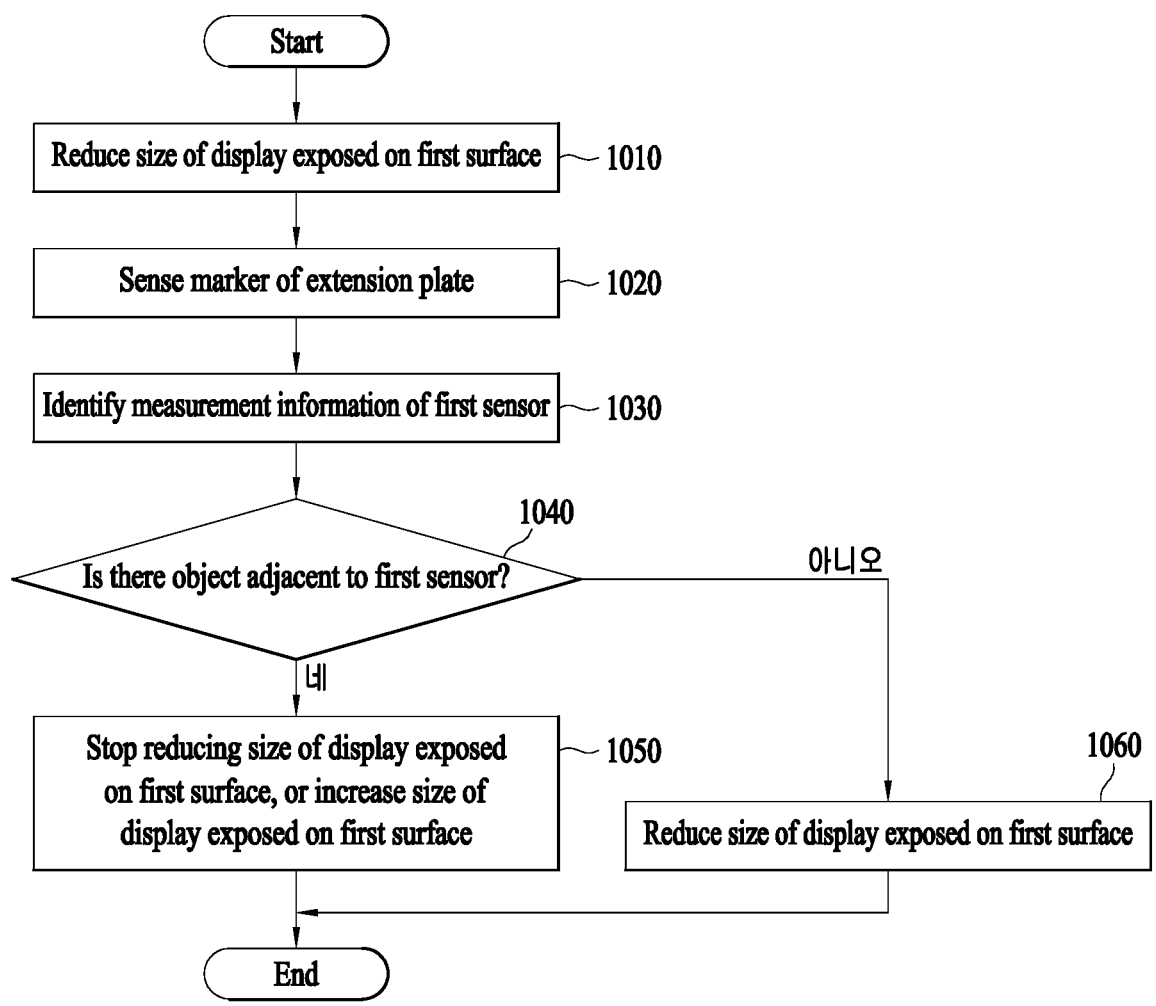
FIG. 10 is a flow chart of a method for controlling an electronic device according to another embodiment of the present disclosure.

FIG. 10 is a flow chart of a method for controlling an electronic device according to another embodiment of the present disclosure. Operations of the method shown in FIG. 10 may be performed by changing the order of shown in FIG. 10 or in any order.

Referring to FIG. 10, the electronic apparatus may reduce the size of the display exposed on the first surface 1010. Specifically, the electronic apparatus may reduce the size of the display exposed on the first surface in response to a first input instructing a reduction in the size of the display.

The size of the display may be reduced by moving the extension plate disposed to correspond to the display. In some cases, the extension plate may include a marker that is separate from the extension in a specific position. The electronic apparatus may include a second sensor (e.g., an OTP sensor) capable of sensing the marker, and may sense the marker of the extension plate using the second sensor in operation 1020.

The position of the second sensor may be fixed and the extension plate may be capable of moving. Accordingly, the marker may be sensed at a certain point in time during a process of reducing the size of the display, for example, at a point in time when the position of the marker corresponds to the position of the second sensor. The size of the display may be identified by sensing the marker.

When the marker is sensed, the electronic apparatus may identify measurement information of the first sensor in operation 1030. The electronic apparatus may identify, based on the measurement information, whether there is an object adjacent to the first sensor in operation 1040. When any object adjacent to the first sensor is sensed, the electronic apparatus may identify that there is an object adjacent to the first sensor. When any object adjacent to the first sensor is not sensed, the electronic apparatus may identify that there is no object adjacent to the first sensor.

When it is identified that there is an object adjacent to the first sensor, the electronic apparatus may stop reducing the size of the display exposed on the first surface or may increase the size of the display exposed on the first surface in operation 1050.

Whether to stop reducing the size of the display exposed on the first surface or increase again the size of the display exposed on the first surface may be predetermined, and the electronic apparatus may control the size of the display based on a predetermined method.

When it is identified that any object adjacent to the first sensor does not exist, the electronic apparatus may continue to reduce the size of the display exposed on the first surface in operation 1050.

In an embodiment, the first sensor may be implemented as any of various configurations for sensing the approach of an object. For example, the first sensor may include at least one of a pressure sensor, a touch sensor, and an optical sensor. In another example, the first sensor may be implemented in a mechanical structure including a spring. This will be described in more detail with reference to the accompanying drawings.

Figure 11:
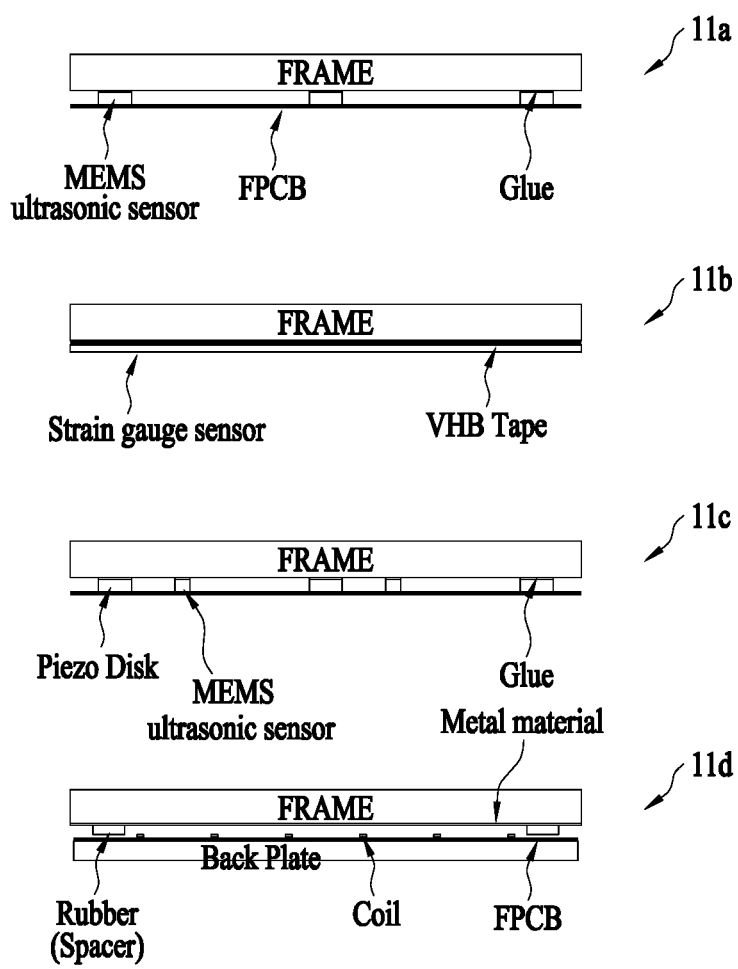
FIG. 11 is a diagram illustrating an example of a sensor of an electronic device according to an embodiment of the present disclosure.

FIG. 11 is a diagram illustrating an example of a sensor of an electronic device according to an embodiment of the present disclosure. Specifically, FIG. 11 shows an embodiment according to a type of a pressure sensor when the first sensor includes the pressure sensor.

Reference numerals 11*a* to 11*d* show cross sections of a body frame and a pressure sensor disposed in contact with the body frame. More specifically, reference numerals 11*a* to 11*d* show cross sections perpendicular to one surface (e.g., one surface 615 in FIG. 6) of the body frame in each embodiment of the pressure sensor.

Reference numeral 11*a* shows an MEMS ultrasonic pressure sensor (hereinafter, referred to as a MEMS ultrasonic sensor). In reference numeral 11*a*, FRAME may correspond to one surface of the body frame opposed to the display frame (e.g., one surface 615 in FIG. 6), and the MEMS ultrasonic sensor may be disposed at at least a portion of the body frame. The portion at which the sensor is disposed may be inside of the body frame, that is, a portion not exposed to the outside. In this case, the strain gauge sensor and the frame may be connected based on Glue (or adhesive). A various types of adhesive may be used as Glue. Since the various types of adhesive is obvious to those skilled in the art, a detailed description thereof will be omitted.

Reference numeral 11*b* shows a strain gauge pressure sensor (hereinafter, referred to as a strain gauge sensor). In reference numeral 11*b*, FRAME may correspond to one surface of the body frame opposed to the display frame (e.g., one surface 615 in FIG. 6), and the strain gauge sensor may be located to contact one surface of the body frame. Here, the strain gauge sensor and the frame may be connected based on, for example, VHB Tape (or an adhesive tape). Since the VHB Tape is obvious to those skilled in the art, a detailed description thereof will be omitted.

Reference numeral 11*c* shows a piezo ultrasonic pressure sensor. In reference numeral 11*c*, FRAME may correspond to one surface of the body frame opposed to the display frame (e.g., one surface 615 in FIG. 6). The piezo disk and the MEMS ultrasonic sensor may be alternately arranged while contacting at least a portion of the body frame, as shown in FIG. 11. In this case, the piezo disk and the MEMS sensor may be connected to Frame based on Glue (or adhesive). A various types of adhesive may be used as Glue.

Since the various types of adhesive is obvious to those skilled in the art, a detailed description thereof will be omitted.

Although not illustrated, the MEMS ultrasonic sensor may be in some cases omitted from reference numeral 11c.

Reference numeral 11d shows an inductive pressure sensor. In reference numeral 11d, FRAME may correspond to one surface of the body frame opposed to the display frame (e.g., one surface 615 in FIG. 6), and an inductive pressure sensor including a rubber, a coil, and a back plate may be disposed at one surface of the body frame.

Reference numeral 11d shows a cross section of the pressure sensor. Although a coil pattern is not shown in detail, the coil may be patterned in various forms on the FPCB. One surface of the body frame at which the pressure sensor is disposed may be a portion not exposed to the outside.

Figure 12:
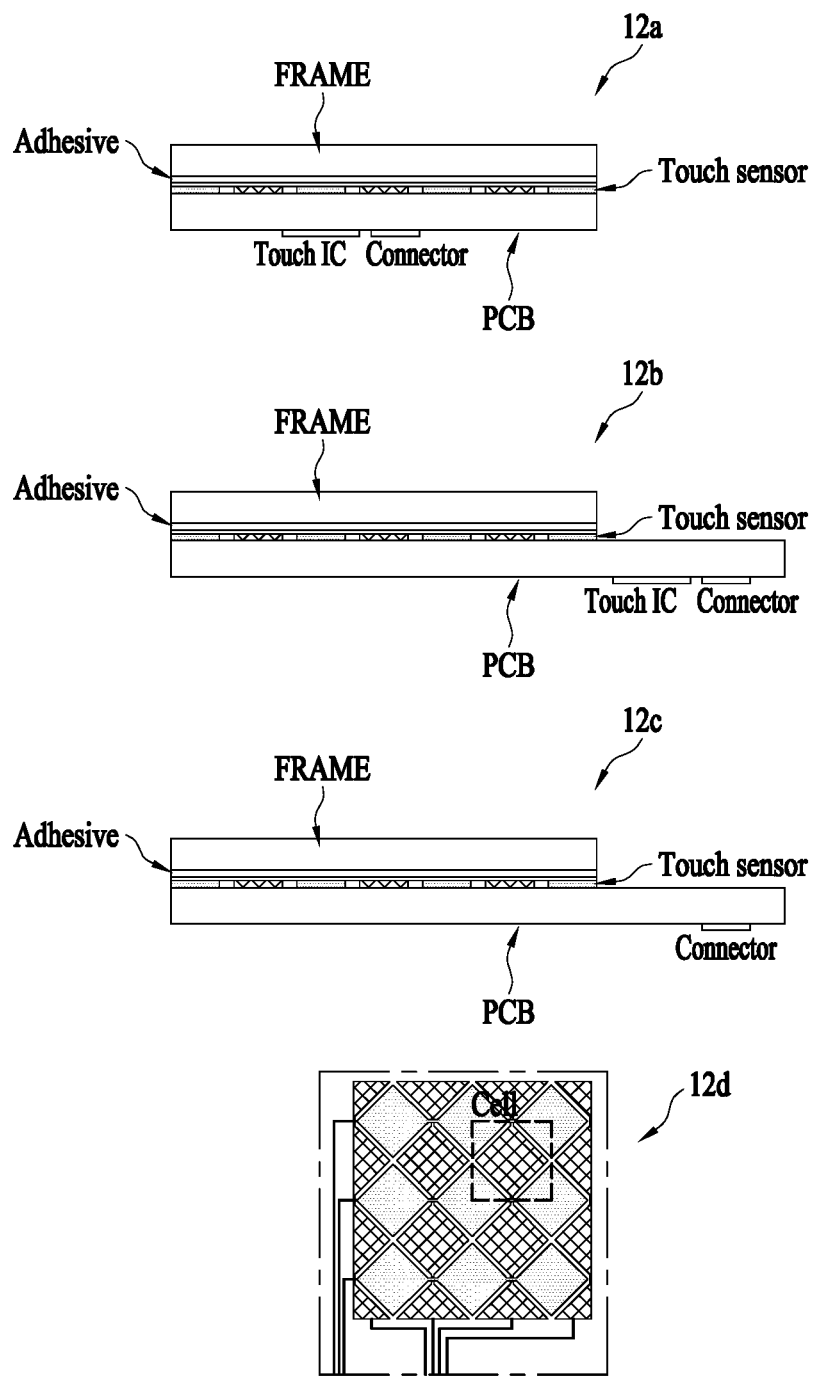
FIG. 12 is a diagram illustrating another example of a sensor of an electronic device according to an embodiment of the present disclosure.

FIG. 12 is a diagram illustrating another example of a sensor of an electronic device according to an embodiment of the present disclosure. Specifically, FIG. 12 shows an embodiment according to implementation of a touch sensor when the first sensor includes the touch sensor.

Reference numeral 12a shows an example of a cross section of a four layer touch sensor, and reference numerals 12b and 12c show examples of a cross section of a two layer touch sensor. Specifically, reference numerals 12a to 12c show cross sections cut transversely to one surface of the body frame (e.g., one surface 615 in FIG. 6). Reference numeral 12d conceptually shows a touch sensor viewed from a surface parallel to one surface of the body frame (e.g., one surface 615 in FIG. 6), the touch sensor which is revealed by removing the body frame.

As shown in FIG. 12, the position of an associated configuration (e.g., Touch IC or Connector) may be changed according to each implementation of the touch sensor, and the position of the associated configuration is not limited to the illustrated example within the scope obvious to those skilled in the art.

In an embodiment, each FRAME in reference numerals 12a to 12c may correspond to one surface of the body frame, and FRAME and the touch sensor may be adhered with adhesive.

Figure 13:
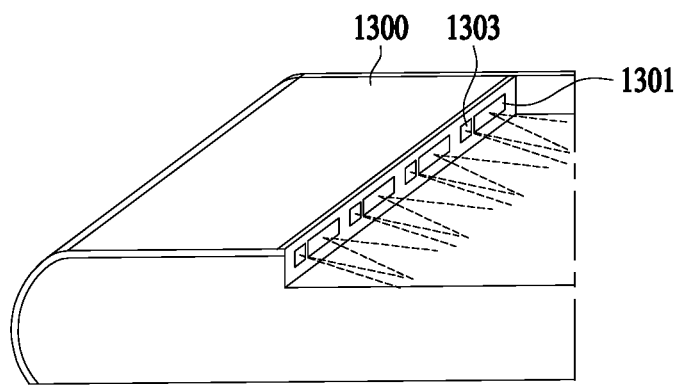
FIGS. 13 and 14 are diagrams illustrating another example of a sensor of an electronic device according to an embodiment of the present disclosure.
Figure 14:
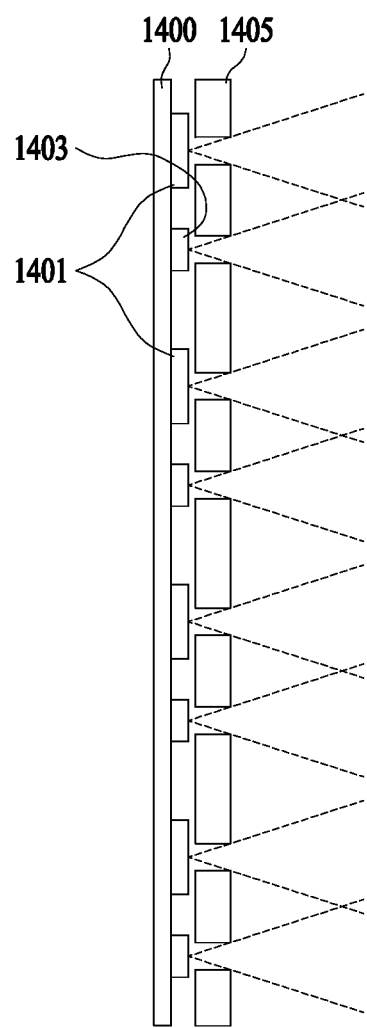

FIGS. 13 and 14 are diagrams illustrating another example of a sensor of an electronic device according to an embodiment of the present disclosure. Specifically, FIGS. 13 and 14 illustrate embodiments in which the first sensor includes an optical sensor. More specifically, FIG. 13 illustrates a body frame at which an optical sensor is disposed, and FIG. 14 illustrates a cross section of at least a portion of FIG. 13.

Referring to FIG. 13, an optical sensor may be disposed at the body frame 1300. The optical sensor may include a sensor that senses the presence or absence of an object in the vicinity by sensing how long it takes to receive a light after emitting the light.

The optical sensor may include at least one LED and at least one PD, and the at least one LED and the at least one PD may be arranged alternately. For example, an LED 1301 and a PD may be alternately arranged as shown in FIG. 13. Accordingly, as the LED emits light and the PD senses the light, it is possible to sense the approach of an object at a portion opposed to one surface of the body frame.

Meanwhile, the body frame 1300 may include holes respectively corresponding to the LED and PD. The size of the hole corresponding to the LED may be greater than the size of the hole corresponding to the PD, but aspects of the present disclosure are not limited thereto.

FIG. 14 illustrates a cross section perpendicular to one surface 1405 at which the optical sensor of the body frame 1300 in FIG. 13 is disposed. Referring to FIG. 14, an LED 1401 and a PD 1403 may be alternately arranged on a PCB 1400, and one surface 1405 of the body frame may include holes respectively corresponding to the LED 1401 and the PD 1403.

Figure 15:
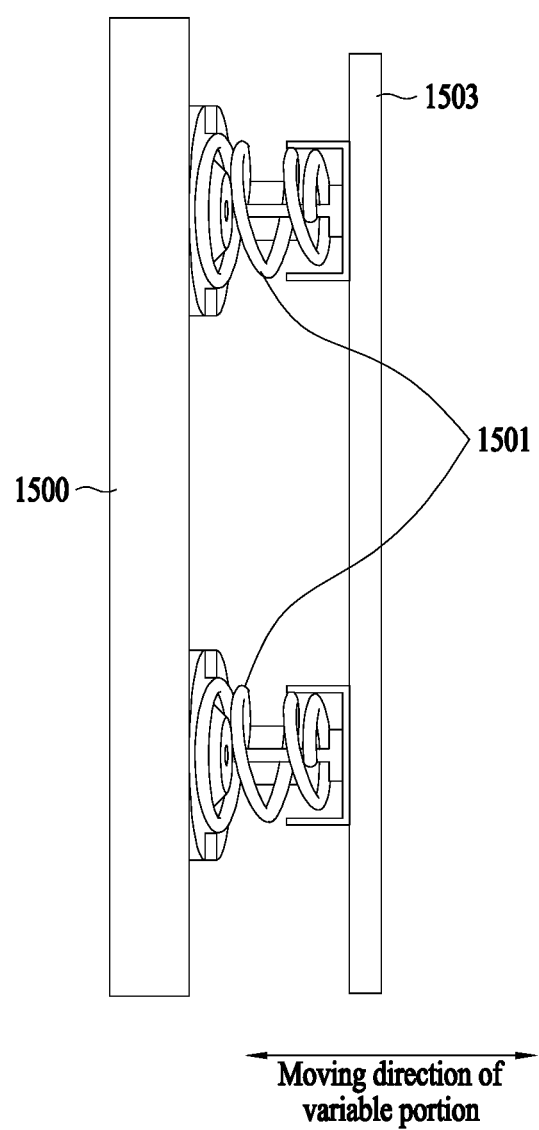
FIGS. 15 and 16 are diagrams illustrating yet another example of a sensor of an electronic device according to an embodiment of the present disclosure.
Figure 16:
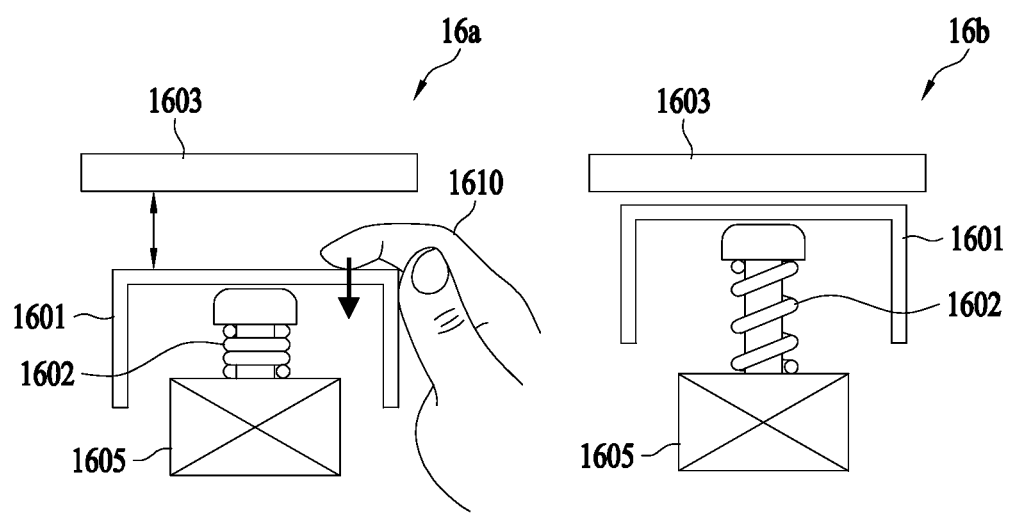

FIGS. 15 and 16 are diagrams illustrating yet another example of a sensor of an electronic device according to an embodiment of the present disclosure. Specifically, FIGS. 15 and 16 illustrate the case where the electronic apparatus identifies the approach of an object using a buffering part.

In an embodiment, the electronic apparatus may include a variable part moving in response to a size change of the display, a fixed part fixed irrespective of a size change of the display, and a buffering part connected to the variable part and having at least a portion to be brought into contact with the variable part in response to a size reduction of the display exposed on the first surface. FIG. 15 illustrates an example of the buffering part, and FIG. 16 illustrates a use example of the buffering part in more detail.

Referring to FIG. 15, the buffering part may include a guide bar 1503 having at least a portion in contact with the variable part, and at least one spring 1501 in contact with the guide bar 1503 and providing an elastic force in response to movement of the guide bar. Each spring 1501 may be disposed in a direction corresponding to a moving direction of the variable part, as shown in FIG. 15.

Although not shown in detail, the buffering part may further include a sensor that is connected to the spring 1501 to sense pressure against the spring. The sensor may be disposed between the frame 1500 and the spring 1501. For a specific example, refer to FIG. 16.

According to reference numeral 16a in FIG. 16, while the variable part 1603 moves in a direction to the fixed part, a user's finger 1610 may be located between the variable part 1603 and the fixed part, more specifically, between the variable part 1603 and the buffering part. In this case, the user's finger 1610 may apply pressure to the buffering part.

The buffering part may include a guide bar 1601, a spring 1602, and a sensor 1605. Although not illustrated, the fixed part may be located at a lower end of the sensor 1605. FIG. 16 illustrates an example in which both ends of the guide bar 1601 are bent into a space where the spring is located. However, the present disclosure is not limited thereto, and the guide bar 1601 may be implemented in a straight bar shape, as shown in FIG. 15.

When the user's finger 1610 applies pressure to the buffering part as shown in reference numeral 16a, the guide bar 1601 may move in a direction to a position at which the sensor 1605 is located and the pressure may be applied to the spring 1602. The sensor 1605 may sense the pressure applied to the spring 1602 based on connectivity to the spring 1602. Accordingly, the presence of the finger 1610 may be identified. That is, the electronic apparatus may use the sensor 1605 to sense the approach of the finger 1610.

Reference numeral 16b shows the case where the user's finger 1610 is not located between the variable part 1603 and the fixed part. The variable part 1603 may be allowed to move up to a position at a predetermined distance from the guide bar 1601 of the buffering part or a position in contact with the guide bar 1601. Accordingly, pressure may not be applied to the buffering part until the movement of the variable part 1603 is completed.

Although an object present between the variable part 1603 and the fixed part is depicted as the user's finger 1610 in FIG. 16, the object is not limited thereto. In addition, although the variable part 1603 is depicted in the shape of a bar, the variable part 1603 is not limited thereto. For example, the variable part 1603 may have a shape corresponding to the display frame.

Figure 17:
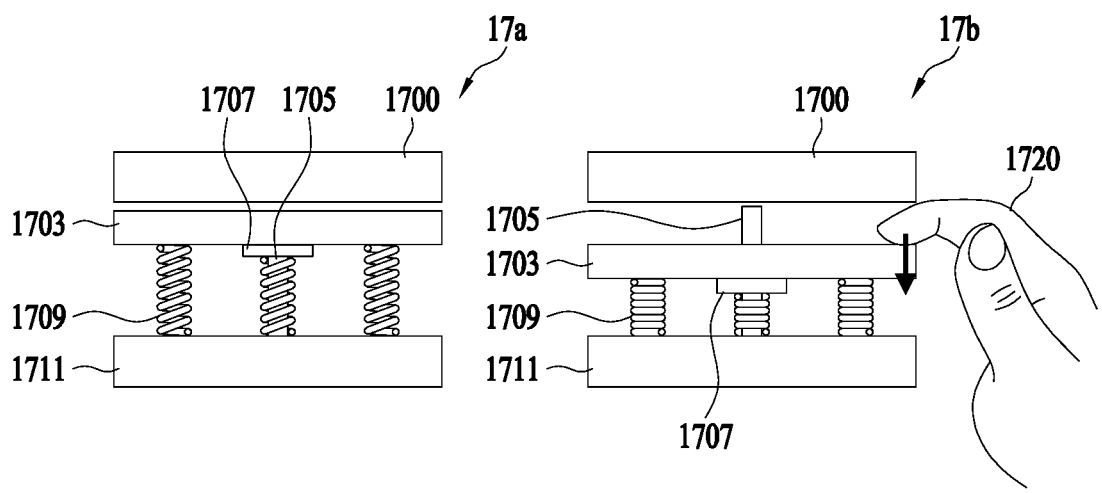
FIG. 17 is a diagram illustrating an example of a configuration included in an electronic device according to an embodiment of the present disclosure.

FIG. 17 is a diagram illustrating an example of a configuration included in an electronic device according to an embodiment of the present disclosure. Specifically, FIG. 17 illustrates the case where a buffering part includes a protrusion 1705 and a support 1707.

Reference numeral 17a in FIG. 17 shows the case where no object is present between a variable part 1700 and the buffering part. Reference numeral 17b shows the case where an object is present between the variable part 1700 and the buffering part.

The buffering part may include a guide bar 1703, at least one first spring 1709 disposed between the guide bar 1703 and a fixed part 1711, a protrusion 1705, a second spring surrounding the protrusion 1705, and a support 1707 connecting the second spring 1707 and the guide bar 1703.

In an embodiment, the guide bar 1703 may have at least a portion that comes into contact with the variable part 1700 moving in response to a size change of the display. For example, when the size of the display is a default size, that is, a non-expanded size, the variable part 1700 and the guide bar 1703 may be in contact with each other. However, aspects of the present disclosure are not limited thereto, and the variable part 1700 and the guide bar 1703 may be spaced a specific distance from each other.

Although not shown, the guide bar 1703 may include a through hole having a size equal to or greater than a cross-sectional size of the protrusion 1705, so that the protrusion 1705 can pass through the through hole. That is, the through hole may be a configuration provided in the guide bar to allow the protrusion 1705 to pass through the through hole when the first spring 1709 is compressed. The protrusion 1705 may pass through the guide bar 1703 through the through hole, as shown in reference numeral 17b.

The protrusion 1705 may be disposed at one surface of the fixed part 1711 in a direction corresponding to a moving direction of the variable part 1700. The size and the position of the protrusion 1705 may be fixed. When a user's finger 1702 is located between the variable part 1700 and the buffering part as shown in reference numeral 17b and pressure is applied to the guide bar 1703, the protrusion 1705 may protrude through the guide bar 1703.

In some cases, the variable part 1700 may continue to move even when the user's finger 1720 is located between the variable part 1700 and the buffering part. In this case, the movement of the variable part 1700 may be blocked by the protrusion 1705.

Figure 18:
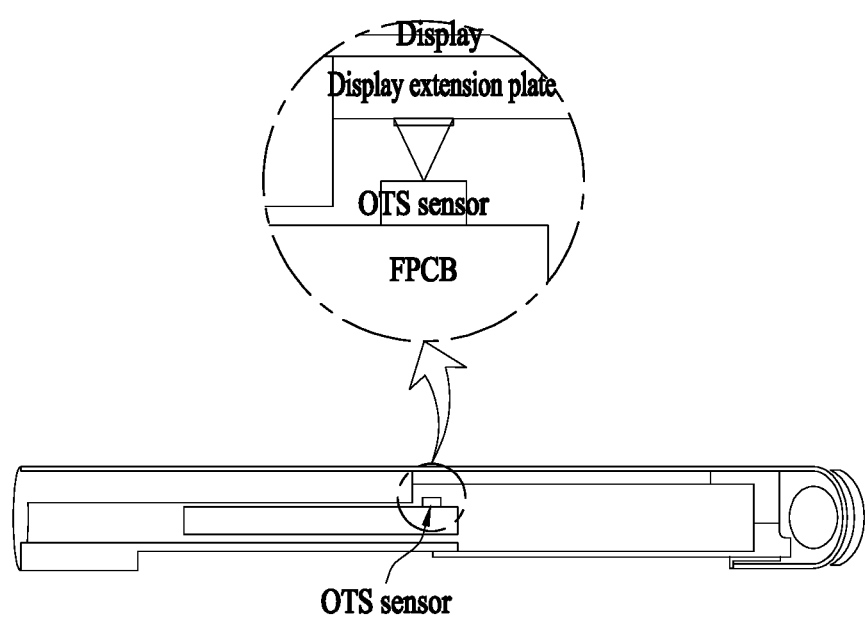
FIG. 18 is a diagram for describing another example of a configuration included in an electronic device according to an embodiment of the present disclosure.

FIG. 18 is a diagram for describing another example of a configuration included in an electronic device according to an embodiment of the present disclosure. Specifically, FIG. 18 illustrates an OTS sensor included in an electronic apparatus and an operation related to the OTS sensor.

Reference numeral 18a shows an example of a cross section perpendicular to a longitudinal direction of the electronic apparatus (or corresponding to a direction in which the display of the electronic apparatus is expanded). According to reference numeral 18a, the electronic apparatus may include an OTS sensor. The OTS sensor may be located at a fixed part of the electronic apparatus. Specifically, the OTS sensor may be located at a PCB (or an FPCB) of the electronic apparatus to face the front surface of the electronic apparatus.

Reference numeral 18b conceptually shows a portion of the electronic apparatus including the OTS sensor, for example, a region indicated by a dotted line in reference numeral 18a. According to reference numeral 18b, the OTS sensor may be disposed at the PCB to face at least a portion of the display extension plate of the electronic apparatus. The display may be disposed at the front surface of the electronic apparatus, and the display extension plate for changing the size of the display may be positioned under the display.

In an embodiment, the OTS sensor may illuminate the laser on the surface of the extension plate and identify the laser reflected back to the extension plate. The surface of the extension plate identified by the OTS sensor may appear in a different pattern at each position. Based on a pattern of the surface of the extension plate, the electronic apparatus may identify the position of the extension plate corresponding to the position of the OTS sensor. Based on the identified position of the extension plate, the electronic apparatus may identify the size of the display.

In an embodiment, the extension plate may include a marker. The marker may be a configuration separate from the extension plate. For example, the marker may be a portion distinguishable in color from the surface of the extension plate. Specifically, the marker may be in black color and the extension may be in gold color. The OTS sensor may distinguish the marker from the expansion plate. In doing so, the electronic apparatus may allow the first sensor to identify the approach of an object from a point in time when the marker is recognized.

Figure 19:
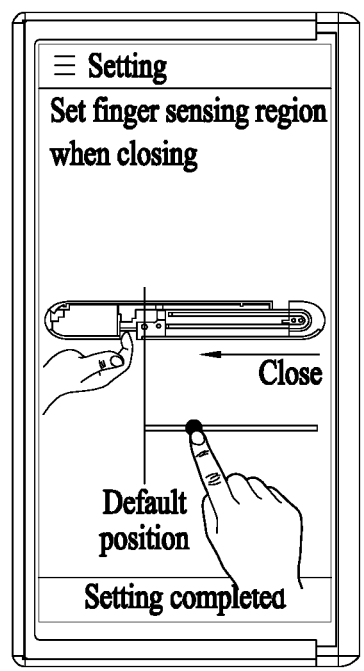
FIGS. 19, 20, and 21 are diagrams illustrating an example of a user interface (UI) provided by an electronic device according to an embodiment of the present disclosure.
Figure 20:
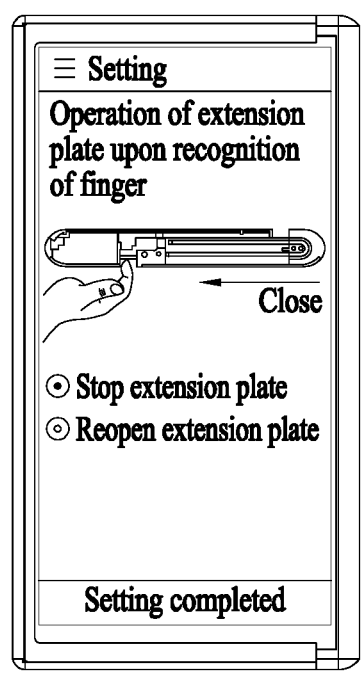
Figure 21:
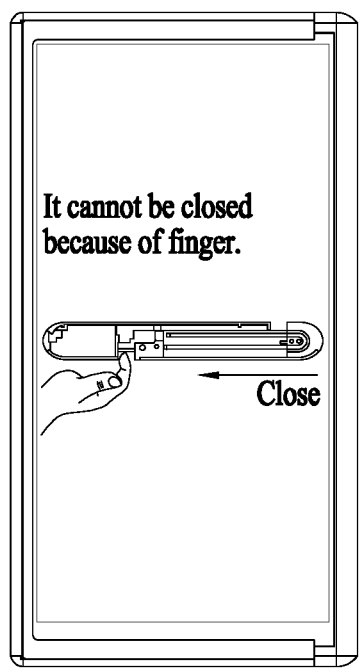

FIGS. 19 to 21 are diagrams illustrating an example of a user interface (UI) provided by an electronic device according to an embodiment of the present disclosure.

FIG. 19 illustrates an example of a UI for setting a condition to start to sense an object. Referring to FIG. 19, an input window for selecting a region where to sense an object in a space defined as the display disposed at the second surface moves to the first surface may be displayed on the electronic apparatus.

A user may control an input icon 1901 to control the size of the region where to sense a finger (hereinafter, referred to as a finger sensing region). For example, when the input icon 1901 is moved to the left, the size of the finger sensing region is reduced, and when the input icon 1901 is moved to the right, the size of the finger sensing region may be increased.

Based on an input to set the finger sensing region, the electronic apparatus may identify the size of the display exposed on the first surface and corresponding to the finger sensing region where an object sensing operation is to be performed by the first sensor. When the size of the display exposed on the first surface is less than the identified size of the display, the electronic apparatus may perform the object sensing operation using the first sensor.

FIG. 20 illustrates an example of a UI for selecting a method of changing a size of a display when the approach of an object is sensed through a first sensor. Referring to FIG. 20, when the approach of an object is sensed through the first sensor, a selection input regarding whether to stop the extension plate or reopen the extension plate may be identified.

When "Stop Extension plate" is selected, the electronic apparatus may stop reducing the size of the display in response to sensing the approach of the object by the first sensor. When "Reopen Extension plate" is selected, the electronic apparatus may stop reducing the size of the display and increase the size of the display in response to sensing the approach of the object through the first sensor.

FIG. 21 illustrates an example of a UI provided through a display when the approach of an object is sensed through a first sensor. In FIG. 21, when the approach of an object is sensed through the first sensor, the electronic apparatus may display a notification window including the text "It cannot be closed because of finger."

Figure 22:
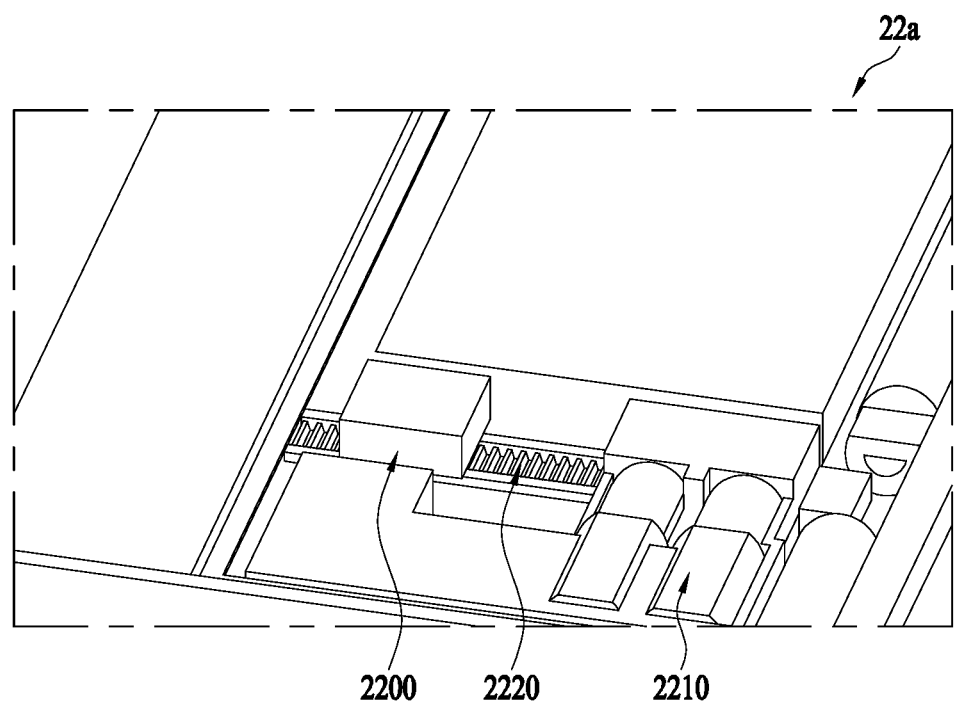
FIGS. 22 and 23 are diagrams illustrating a motor and a motor-related operation in an electronic device according to an embodiment of the present disclosure.
Figure 22:
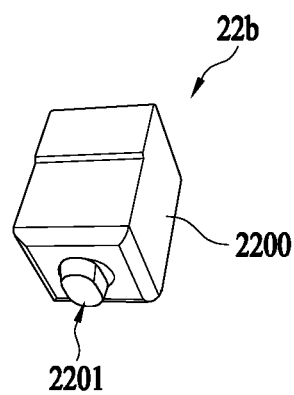
Figure 23:
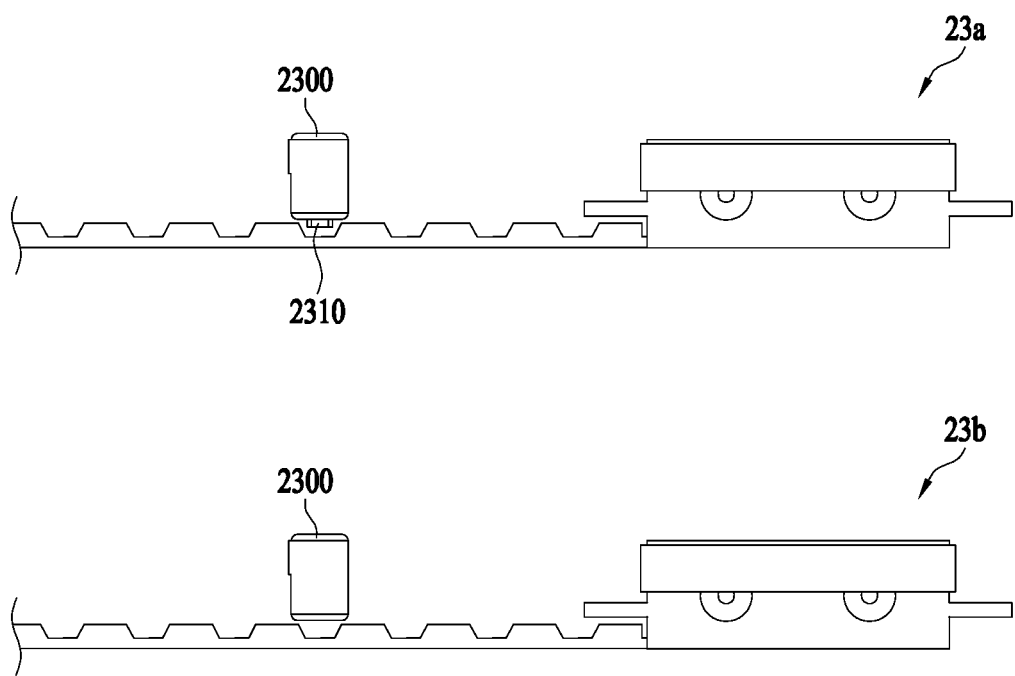

FIGS. 22 and 23 are diagrams illustrating a motor and a motor-related operation in an electronic device according to an embodiment of the present disclosure. Specifically, FIG. 22 illustrates a motor and a stopper included in the electronic apparatus, and FIG. 23 illustrates operations of the motor and the stopper.

According to reference numeral 22a in FIG. 22, a motor 2210 may be disposed in the electronic apparatus. The motor 2210 may be connected to a rack 2220 which moves in response to a driving of the motor 2210.

The position of the rack 2220 may be changed by the driving the motor 2210. One end of the rack 2220 may be connected to a configuration (e.g., a display frame) associated with movement of the display. In this case, the size of the display may be changed in response to the movement of the rack 2220.

Although not shown, in an embodiment, the motor 2210 may include a pinion that engages the rack 2220. The pinion may be rotated based on the driving of the motor, the pinion may engage the rack 2220, and, in turn, the rack 2220 may move. According to an embodiment, the rack 2220 may be referred to as a rack gear, but not limited thereto. For example, a combination of the rack 2220 and the pinion may be referred to as a rack gear.

Reference numeral 22b shows an example of the stopper in association with the movement of the rack 2220. The rack 2220 may include a plurality of grooves, and a head 2201 of the stopper 2200 may be inserted into one of the plurality of grooves. In an embodiment, the position of the head 2201 may be changed under the control of the electronic apparatus. For example, the head 2201 may be exposed from the inside of the stopper to the outside under the control of the electronic apparatus.

The stopper 2200 may be a configuration disposed in the electronic apparatus to limit the movement of the rack 2220. However, in some implementations, the position of the stopper 2200 may vary. For example, the electronic apparatus may move the position of the stopper 2200 to limit the movement of the rack 2220, so that the head 2201 of the stopper 2200 can be inserted into the groove of the rack 2220.

Examples of the stopper 2200 and the motor 2210 are not limited to what is illustrated in the drawings. The stopper 2200 and the motor may be changed in various forms within the scope obvious to those skilled in the art.

Reference numeral 23a in FIG. 23 shows an example in which a head 2310 of a stopper 2300 is inserted into the groove of the rack, and reference numeral 23b shows an example in which the head 2310 of the stopper 2300 is not inserted into the groove of the rack.

The position of the stopper 2300 may be fixed. Accordingly, when the head 2310 of the stopper 2300 is inserted into the groove of the rack as shown in reference numeral 23a, the groove of the rack may be caught by the stopper 2300 and thus the movement of the rack may be limited.

In an embodiment, the electronic apparatus may use the stopper 2300 to stop changing the size of the display. For example, when an object is sensed through the first sensor, the electronic apparatus may stop changing the size of the display by use of the stopper.

In another example, when an object is sensed through the first sensor, the electronic apparatus may execute a command to stop changing the size of the display. The electronic apparatus may identify the size of the display in response to the execution of the command. In this case, if it is determined that the operation of changing the size of the display is not stopped, the electronic apparatus may physically stop changing the size of the display by use of the stopper 2300.

Referring to FIG. 23, whether to expose the head 2310 to limit the movement of the rack may be controlled. For example, the electronic apparatus may control the head 2310 to be exposed as shown in reference numeral 23a so that the movement of the rack can be limited. The electronic apparatus may prevent the head 2310 from being exposed as shown in reference numeral 23b so that the rack can move.

However, in some cases, the head 2310 may be implemented to be continuously exposed. In this case, the insertion of the head 2310 into the groove may be controlled by controlling the position of the stopper.

An electronic apparatus and a method for controlling the same according to an embodiment of the present disclosure may control the size of a display by sensing an object approaching a space of a second surface, the space formed as the display disposed at the second surface of the electronic apparatus moves to a first surface. Accordingly, the electronic apparatus may change the size of the display more appropriately according to a use state of the electronic apparatus.

In addition, the electronic apparatus and the method for controlling the same according to an embodiment of the present disclosure may stop changing the size of the display or return the size of the display to its original size when the approach of an object is sensed during a process of changing the size of the display, thereby preventing an error or a damage which possibly occurs when the size changing operation keeps being performed despite the approach of the object.

The electronic apparatus and the method for controlling the same according to an embodiment of the present disclosure control the size of the display based on sensing the approach of an object to a region associated with changing the size of the display, thereby changing the size of the display more appropriately in consideration of a use state of the electronic apparatus.

In addition, according to an embodiment of the present disclosure, when the approach of an object is sensed during changing the size of the display, the size changing operation may be stopped or the size of the display may be returned to its original size, thereby preventing an error which possibly occurs in the progress of the size changing operation.

Effects are not limited to the aforementioned effects, and other effects not mentioned will be clearly understood by those skilled in the art from the description of the claims.

Effects are not limited to the aforementioned effects, and other effects not mentioned will be clearly understood by those skilled in the art from the description of the claims. The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. An electronic apparatus comprising:
a flexible display comprising at least a portion disposed at a first surface, wherein a size of the flexible display exposed on the first surface is changeable;
a body frame disposed at a second surface opposite the first surface;
a display frame movable to decrease a distance between the display frame and a first region of the body frame in response to a reduction in the size of the flexible display exposed on the first surface;
a first sensor disposed at at least a portion of the first region of the body frame and configured to sense an approach of an object; and
a controller configured to control the size of the flexible display exposed on the first surface based on measurement information of the first sensor,
wherein the first region of the body frame has, among at least one surface of the body frame, a surface corresponding to a position of the display frame.

2. The electronic apparatus of claim 1, wherein the controller is further configured to:
change the size of the flexible display exposed on the first surface according to an instruction regarding a change in the size of the flexible display exposed on the first surface;
in response to sensing, based on the measurement information, any object adjacent to a space defined as the flexible display disposed at the second surface moves to the first surface, stop changing the size of the flexible display exposed on the first surface; and
in response to not sensing, based on the measurement information, any object adjacent to the space, continue to change the size of the flexible display exposed on the first surface according to the instruction.

3. The electronic apparatus of claim 1, wherein the controller is further configured to:
in response to a first input that instructs a reduction in the size of the flexible display exposed on the first surface to be made, reduce the size of the flexible display exposed on the first surface; and
in response to the size of the flexible display exposed on the first surface being less than a first size:
stop reducing the size of the flexible display exposed on the first surface corresponding to the first input, based on the measurement information; or
stop reducing the size of the flexible display exposed on the first surface corresponding to the first input and increase the size of the flexible display exposed on the first surface, based on the measurement information.

4. The electronic apparatus of claim 1, further comprising:
an extension plate disposed adjacent to an inner side of the flexible display exposed on the first surface, wherein the extension plate is provided with a marker that moves in response to a change in the size of the flexible display exposed on the first surface and that indicates a position at a specific point; and
a second sensor configured to sense the marker,
wherein the controller is further configured to, when the marker is sensed through the second sensor and any object adjacent to the sensor is sensed, stop reducing the size of the flexible display exposed on the first surface or increase the size of the flexible display exposed on the first surface.

5. The electronic apparatus of claim 4, wherein:
the marker is disposed on the extension plate facing the second surface; and
the second sensor is disposed at a board that is fixed irrespective of a change in the size of the flexible display exposed on the first surface.

6. The electronic apparatus of claim 1, further comprising:
a motor; and
a rack having a groove, the rack configured to move in response to a driving of the motor, and to change the size of the flexible display exposed on the first surface in association with the flexible display; and
a stopper comprising at least a portion to be inserted into the groove based on the measurement information of the first sensor to limit movement of the rack.

7. The electronic apparatus of claim 1, further comprising:
a fixed portion; and
a variable portion movable in response to a change in the size of the flexible display exposed on the first surface,
wherein the first sensor is disposed at the fixed portion, and
wherein at least a portion of the flexible display is disposed at the variable portion.

8. The electronic apparatus of claim 1, wherein:
the first sensor comprises a metallic electrode portion and a detecting portion configured to detect a change in capacitance of the metallic electrode portion; and
the metallic electrode portion has a predetermined size based on a degree of the change in the capacitance caused by the approach of the object.

9. The electronic apparatus of claim 1, wherein:
the first sensor comprises at least one of a pressure sensor, a touch sensor, or an optical sensor;
if the first sensor comprises the optical sensor, the optical sensor comprises at least one light emitting diode (LED) and at least one photodiode (PD) that are alternately arranged; and
if the first sensor comprises the pressure sensor, the pressure sensor comprises at least one of a strain gauge pressure sensor, an inductive pressure sensor, a micro electro mechanical systems (MEMS) ultrasonic pressure sensor, or a piezo ultrasonic pressure sensor.

10. The electronic apparatus of claim 1, further comprising:
a fixed portion;
a variable portion movable in response to a change in the size of the flexible display exposed on the first surface; and
a buffer portion connected to the fixed portion and comprising at least a portion to be brought into contact with the variable portion in response to a reduction in the size of the flexible display exposed on the first surface,
wherein the buffer portion is disposed at one surface of the fixed portion, and comprises a spring disposed in a direction corresponding to a moving direction of the variable portion, and a second sensor connected to the spring to sense pressure against the spring, and
wherein the controller is further configured to, based on the pressure sensed by the second sensor, stop changing the size of the flexible display exposed on the first surface or increase the size of the flexible display exposed on the first surface.

11. The electronic apparatus of claim 1, further comprising:
a fixed portion;

a variable portion movable in response to a change in the size of the flexible display exposed on the first surface; and a buffer portion connected to the fixed portion and having at least a portion to be brought into contact with the variable portion in response to a reduction in the size of the flexible display exposed on the first surface, wherein the buffer portion comprises:

a guide bar comprising at least a portion in contact with the variable portion;

at least one first spring in contact with the fixed portion and the guide bar and configured to provide an elastic force in response to movement of the guide bar;

a protrusion disposed at one surface of the fixed portion to protrude in a direction corresponding to a moving direction of the variable portion; and a second spring surrounding the protrusion.

12. A method for controlling an electronic apparatus comprising a flexible display, a body frame, and a display frame, wherein at least a portion of the flexible display is disposed at a first surface of the electronic apparatus, the method comprising:

receiving measurement information from a first sensor, wherein the first sensor is disposed at at least a portion of a first region of the body frame located at a second surface of the electronic apparatus, and configured to sense an approach of an object, wherein the second surface is opposite the first surface; and controlling, based on the measurement information, a size of the flexible display exposed on the first surface of the electronic apparatus, wherein the first region of the body frame has a surface corresponding to a position of the display frame in the body frame, and wherein the display frame is movable to decrease a distance between the display frame and the first region of the body frame in response to a reduction in the size of the flexible display exposed on the first surface.

13. An electronic apparatus comprising:

a body frame;

a display frame capable of slidably moving relative to the body frame in a first direction or a second direction opposite to the first direction;

a flexible display comprising at least a portion disposed at a first surface of the body frame, wherein a size of the flexible display exposed on the first surface changes as the body frame and the display frame slidably move relative to each other in the first direction or the second direction;

a first sensor disposed at at least one region of a second surface of the body frame and configured to sense an approach of an object, wherein the second surface is opposite the first surface; and a controller configured to, based on measurement information output by the first sensor, control the size of the flexible display exposed on the first surface of the body frame.

14. The electronic apparatus of claim 13, wherein the at least one region of the second surface, at which the first sensor is disposed, corresponds to the first direction or the second direction in which the display frame slidably moves.

15. The electronic apparatus of claim 13, wherein a first end of the flexible display is disposed at the first surface of the body frame, and a second end of the flexible display is disposed at a rear surface of the display frame.

16. The electronic apparatus of claim 15, wherein the rear surface of the display frame has a rear window.

17. The electronic apparatus of claim 15, wherein the second end of the flexible display comprises a guide rail formed to slidably move to correspond to a change in the size of the flexible display exposed on the first surface of the body frame from a side surface of the display frame in a third direction perpendicular to the first direction.

18. The electronic apparatus of claim 13, wherein one recessed region of the second surface of the body frame is exposed in response to a sliding movement of the display frame.

19. The electronic apparatus of claim 18, wherein the first sensor is disposed perpendicular to the one recessed region of the second surface.

20. The electronic apparatus of claim 18, wherein the first sensor is configured to sense the approach of the object toward the one recessed area of the second surface.

* * * * *